(12) United States Patent
Akiba et al.

(10) Patent No.: US 8,813,415 B2
(45) Date of Patent: Aug. 26, 2014

(54) FISHING LINE GUIDE AND METHOD OF MANUFACTURING FISHING LINE GUIDE

(75) Inventors: Masaru Akiba, Higashikurume (JP); Masayuki Watanabe, Higashikurume (JP); Hideyuki Naitou, Higashikurume (JP); Eiji Sugaya, Higashikurume (JP)

(73) Assignee: Globeride, Inc., Tokyo (JP)

( * ) Notice: Subject to any disclaimer, the term of this patent is extended or adjusted under 35 U.S.C. 154(b) by 124 days.

(21) Appl. No.: 13/064,482

(22) Filed: Mar. 28, 2011

(65) Prior Publication Data

US 2011/0239519 A1 Oct. 6, 2011

(30) Foreign Application Priority Data

| Mar. 31, 2010 | (JP) | ............................. P. 2010-080449 |
| Jun. 21, 2010 | (JP) | ............................. P. 2010-140159 |
| Sep. 28, 2010 | (JP) | ............................. P. 2010-217807 |

(51) Int. Cl.
 *A01K 87/04* (2006.01)
(52) U.S. Cl.
 USPC ............................................................ 43/24
(58) Field of Classification Search
 USPC ............................................................ 43/24
 IPC ............................................................ A01K 87/04
 See application file for complete search history.

(56) References Cited

U.S. PATENT DOCUMENTS

| 4,186,508 A * | 2/1980 | Howald ............................. 43/24 |
| 4,616,438 A | 10/1986 | Ohmura |
| 4,682,439 A | 7/1987 | Inoue et al. |
| 5,347,743 A | 9/1994 | Tokuda et al. |
| 6,154,998 A * | 12/2000 | Hashimoto et al. ................ 43/24 |
| 6,189,255 B1 * | 2/2001 | Muneki et al. ..................... 43/24 |
| 6,339,896 B1 * | 1/2002 | Akiba ......................... 43/18.1 R |
| 6,543,178 B2 * | 4/2003 | Sunaga et al. ..................... 43/24 |
| 2002/0023380 A1 | 2/2002 | Sunaga et al. |
| 2003/0115789 A1 * | 6/2003 | Morimoto et al. ................. 43/24 |
| 2006/0283073 A1 | 12/2006 | Omura |

FOREIGN PATENT DOCUMENTS

| CN | 1493189 A | 5/2004 |
| JP | 60-95858 U | 6/1985 |
| JP | 60-151363 U | 10/1985 |
| JP | 62-91972 U | 6/1987 |
| JP | 02-305580 A | 12/1990 |
| JP | 05-184267 A | 7/1993 |
| JP | 09-154443 A | 6/1997 |

(Continued)

OTHER PUBLICATIONS

Extended European Search Report dated Mar. 12, 2013.

(Continued)

*Primary Examiner* — Darren W Ark
*Assistant Examiner* — Lisa Tsang
(74) *Attorney, Agent, or Firm* — McGinn IP Law Group, PLLC

(57) ABSTRACT

A fishing line guide to be attached to a fishing rod includes a frame that includes a fixing part to be fixed to an exterior surface of the fishing rod, a holding part which holds a ring-shaped guide ring through which a fishing line is to pass, and a connecting part connecting the fixing portion to the holding part. The frame includes a fiber reinforced synthetic resin including a fiber bundle including a plurality of reinforced fibers extending in an extending direction of a part forming the holding part and the connecting part.

4 Claims, 23 Drawing Sheets

(56) References Cited

FOREIGN PATENT DOCUMENTS

| | | |
|---|---|---|
| JP | 09-233978 A | 9/1997 |
| JP | 3077893 B2 | 8/2000 |
| JP | 2000-316428 A | 11/2000 |
| JP | 2000-333562 A | 12/2000 |
| JP | 3174806 B2 | 6/2001 |
| JP | 2004-024079 A | 1/2004 |
| JP | 2006-340661 A | 12/2006 |
| JP | 2010-154860 A | 7/2010 |
| JP | 2011-205998 A | 10/2011 |
| JP | 2011-229490 A | 11/2011 |

OTHER PUBLICATIONS

Japanese Notification of Reasons for Refusal dated Mar. 21, 2013 with English translation.

Chinese Notification of First Office Action dated Jun. 21, 2013 with English translation.

Japanese Notification of Reasons for Refusal dated Oct. 10, 2013 with English translation.

* cited by examiner

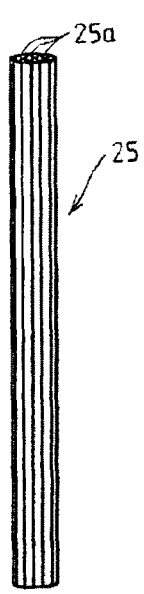 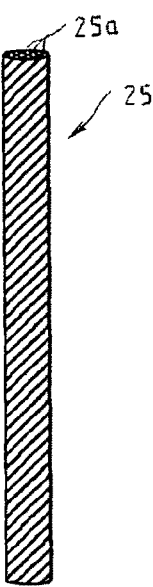 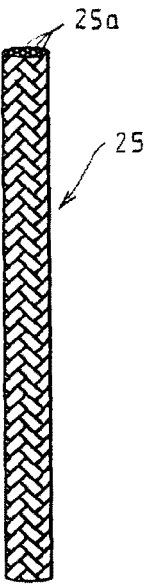
FIG. 12A     FIG. 12B     FIG. 12C
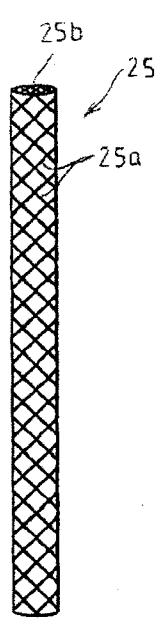 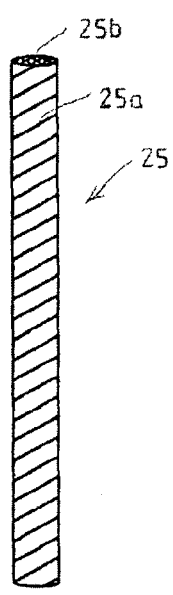 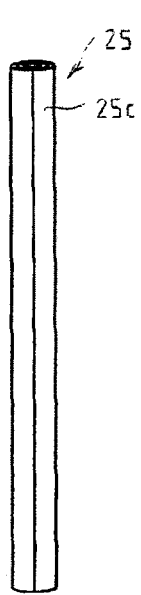 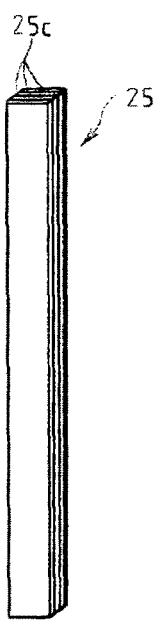
FIG. 12D     FIG. 12E     FIG. 12F     FIG. 12G

FISHING LINE GUIDE AND METHOD OF MANUFACTURING FISHING LINE GUIDE

BACKGROUND ART

The present invention relates to a fishing line guide mounted on a fishing rod to guide a fishing line, and more particularly, to a fishing line guide having a feature in a frame part maintaining a guide ring that a fishing line is inserted therein and passes through, and a method of manufacturing the same.

Conventionally, the fishing line guide is provided with a frame mounted on an outer circumferential surface, and a guide ring fixed to the frame and into which a fishing line is inserted and penetrated. It is well known that the frame, for example, as disclosed in Japanese Patent Application Publication No. 2006-340661, is formed in one body by processing a metal-based plate material such as stainless still or titanium, and the frame is formed in one body with ring holding part for maintaining the guide ring into which a fishing line is inserted and penetrated and a fixing part for fixing the frame to an outer surface of the fishing rod.

SUMMARY OF THE INVENTION

In the above-mentioned conventional art, since the frame is made of a metal material, it has a weight problem and a low flexible performance thereby causing a serious obstacle to achieve an enhancement in a performance of a fishing rod. For example, if a fishing rod, which needs a relatively light weight, is mounted thereon with a plurality of fishing line guides as described above along an axial direction, the fishing rod cannot demonstrate a demanded performance.

The present invention has been made in an effort to solve the above-described problems associated with the conventional art, and is to provide a fishing line guide having a light weight and an excellent performance in specific strength, specific stiffness and flexibility and a method of manufacturing the same.

An aspect of the invention provides the following arrangements.

(1) A fishing line guide comprising:
a frame made of a fiber reinforced synthetic resin including a reinforced fiber extending in an extending direction of a part forming the frame.
(2) The fishing line guide according to (1), wherein the reinforced fiber is formed in a fiber bundle including a plurality of reinforced fibers.
(3) The fishing line guide according to (2), wherein the plurality of reinforced fibers are tangled with each other.
(4) The fishing line guide according to any one of (1) to (3), wherein
the frame includes a holding part for holding a ring shaped guide ring, and
the reinforced fiber includes a reinforced fiber extending in an extending direction of the holding part.
(5) The fishing line guide according to (4), wherein
the frame includes a connecting part connected to the holding part, and
the reinforced fiber includes a reinforced fiber extending in an extending direction of the connecting part.
(6) The fishing line guide according to (4), wherein
the frame includes a connecting part connected to the holding part and a fixing part for attaching a fishing rod, the fixing part being provided at an end part of the connecting part, the frame includes a reinforced fiber extending in an extending direction from the connecting part to the fixing part.
(7) The fishing line guide according to any one among (1) to (6), wherein
the frame includes a branch part divided in different directions, and
the branch part includes a reinforced fiber extended from one side of the branch to the other side of the branch.
(8) The fishing line guide according to (7), wherein the branch part includes a portion where a ratio of synthetic resin is higher than that of the connecting part.
(9) The fishing line guide according to (7), wherein the reinforced fiber continues from the holding part to the connecting part.
(10) The fishing line guide according to (4), wherein the reinforced fiber extends at least quarter cycle of the holding part.
(11) The fishing line guide according to (2), wherein the plurality of reinforced fibers of the fiber bundle including are braided.
(12) A method of manufacturing a fishing line guide, comprising:
arranging a fiber reinforced synthetic resin material in a groove formed in a mold, the fiber reinforced synthetic resin material being a matrix material of a reinforced fiber and a synthetic resin; and
heating and molding the fiber reinforced synthetic resin material.
(13) The method according to (12), further comprising:
filling the groove of the mold with a synthetic resin to form the frame.
(14) The method according to (12) or (13), wherein
the reinforced fiber is formed of a fiber bundle of a plurality of reinforced fibers, and
the fiber bundle is arranged along the curved groove of the mold to be accommodated therein.
(15) The method according to any one of (12) to (14), wherein the fiber bundle follows an extending direction of the groove of the mold, and the fiber bundle is continuously arranged between at least two parts among the ring holding part, connecting part and fixing part that form the frame.
(16) The method according to any one of (12) to (15), wherein
the mold includes a convex surface and a concave surface that are in surface contact with each other, and
the convex surface is formed thereon with the groove for molding the frame.

BRIEF DESCRIPTION OF THE DRAWINGS

FIGS. 12A to 12G are views showing illustrative structures of fiber bundle.

DESCRIPTION OF EXEMPLARY EMBODIMENTS

Hereinafter, a fishing line guide and a method according to the exemplary embodiments will be described in detail with reference to the accompanying drawings.

First Embodiment

Figure 1:
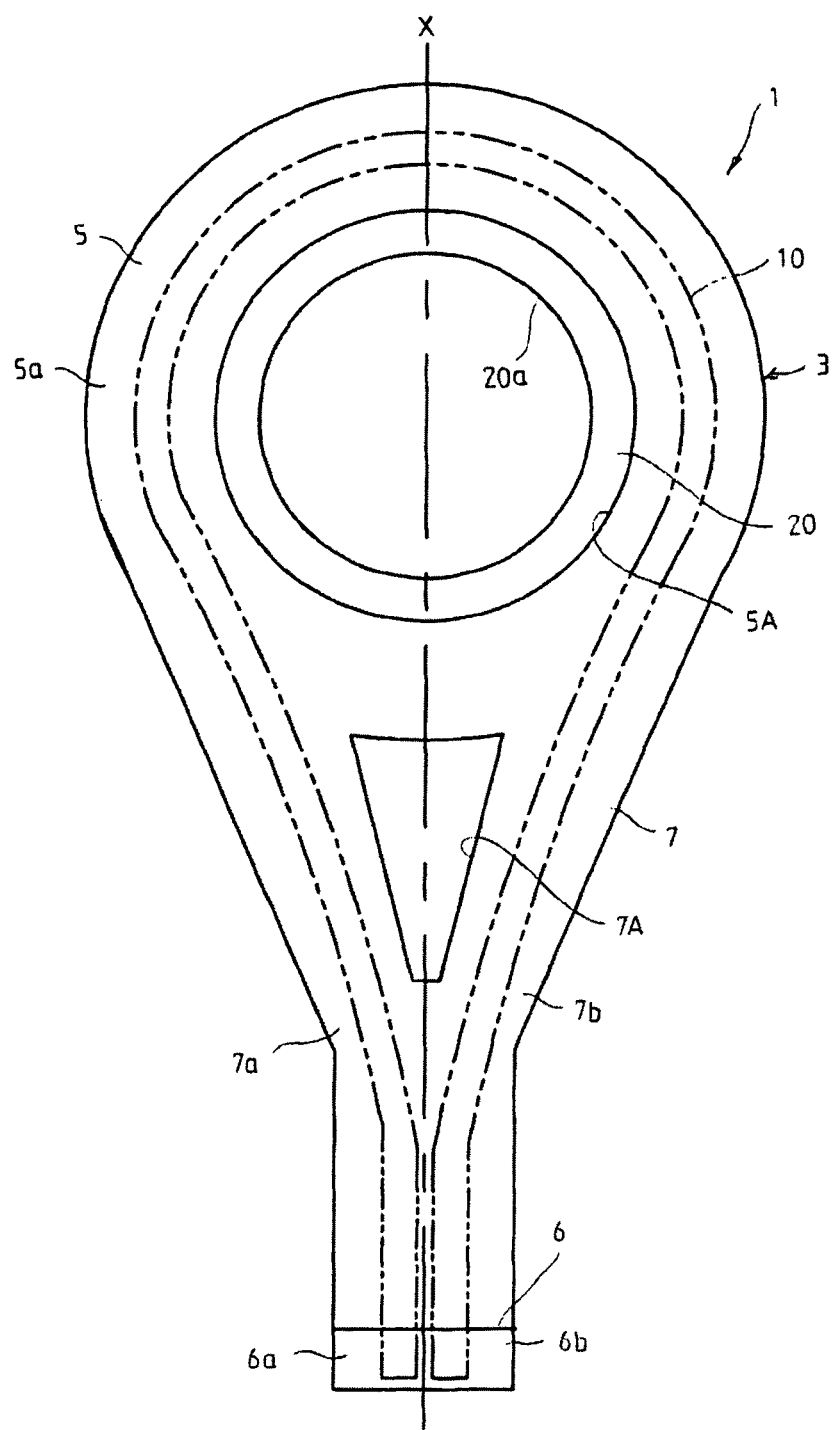
FIG. 1 is a front view showing a fishing line guide according to a first embodiment.
Figure 2:
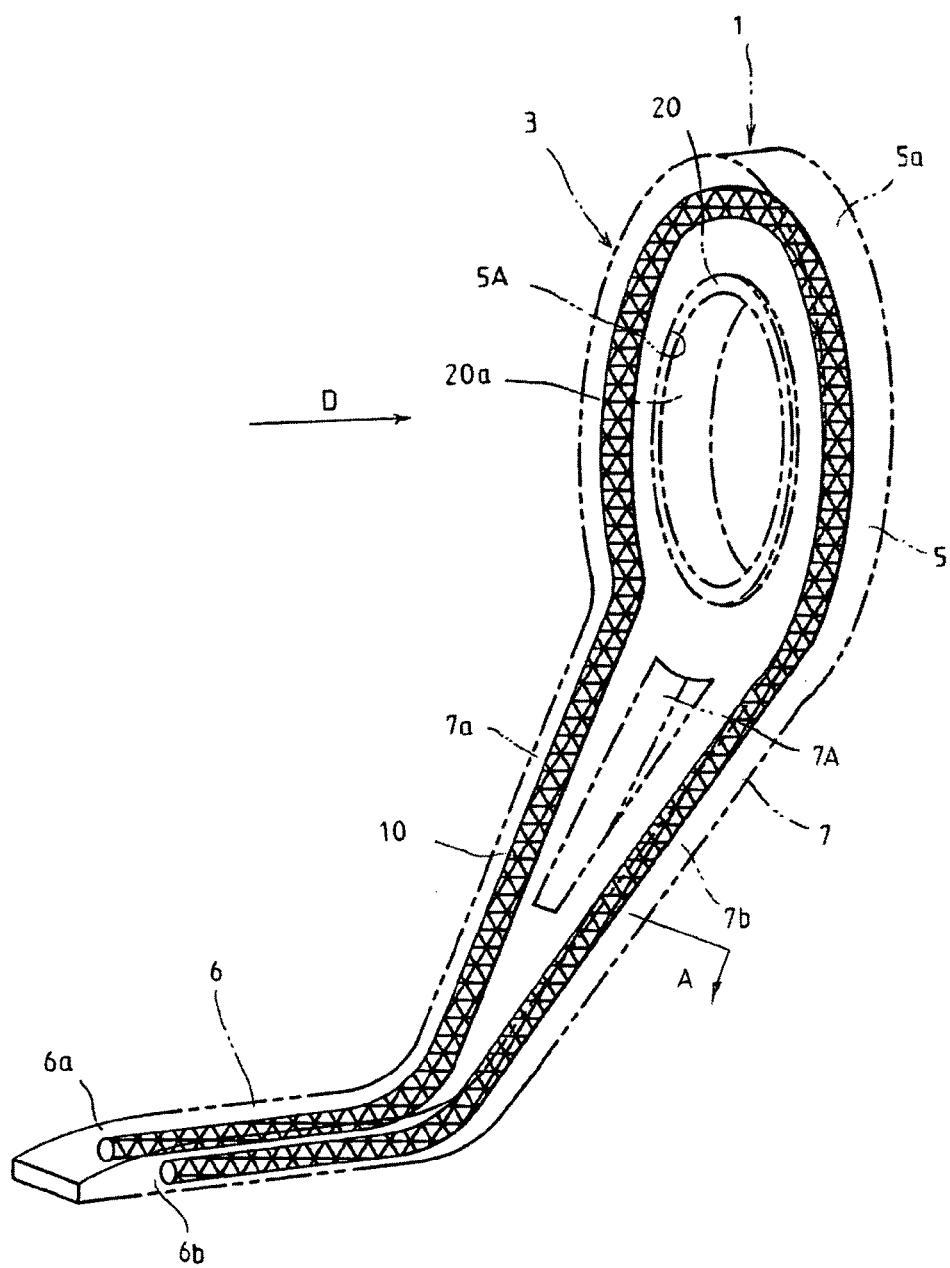
FIG. 2 is a perspective view showing a state of reinforced fiber in the fishing line guide shown in FIG. 1.

First, a fishing line guide according to the first embodiment will be described with reference to FIG. 1 and FIG. 2. In these drawings, FIG. 1 is a front view of a fishing line guide, and FIG. 2 is a perspective view showing a state of reinforced fiber in the fishing line guide shown in FIG. 1. Meanwhile, the direction of arrow D1 shown in FIG. 2 is identical to an axial direction of a fishing rod when the fishing line guide is mounted on the fishing rod, and the fixing part at a butt rod side is mounted on the fishing rod (FIG. 1 is a view when FIG. 2 is viewed in the direction of arrow D1). Hereinafter, a front side (forward side) means a base rod side and a rear side (backward side) means a base end side (butt rod side). Also, a left and right direction means a left and right direction relative to an axial line X when the frame is viewed in a direction of arrow D1.

The fishing line guide 1 is provided with a frame 3 made of a synthetic resin impregnated reinforced fiber, so called fiber reinforced resin. The frame 3 includes a ring holding part 5 holding a guide ring 20 through which a fishing line is to be inserted and passes, and a fixing part 6 to be fixed to an outer side surface of a fishing rod. In this embodiment, a connecting part (support leg portion) 7 is prepared between the holding part 5 and the fixing part 6. That is, the fixing part 6 is integrally formed by bending an end part of the connecting part 7 toward a base end side. Meanwhile, the connecting part 7, as shown in FIG. 2, is raised obliquely upward from the fixing part 6 thereby preventing the fishing line from getting tangled.

A fishing line, which is inserted into and passes through a guide ring 20, secures a predetermined gap formed therebetween with an outer surface of the fishing rod by forming the connecting part 7 between the ring holding part 5 and the fixing part 6.

The holding part 5 is formed in a plate shape wider in a left and right direction than the thickness in a forward and backward direction (a direction of arrow D shown in FIG. 2), and is formed at the center region thereof with an opening 5A for fitting the guide ring 20. The opening 5A may be integrally formed when the frame 3 is molded by a mold. The connecting part 7 is formed with a through hole 7A, which has bilateral symmetrical shape, at a position including an axial line of the center thereof, thereby enabling to achieve a lightweight in the frame part.

The frame 3 is formed of a fiber reinforced resin having a reinforced fiber extending in an extending direction of the frame, that is, the reinforced fiber forming the frame extends along the frame. All of the reinforced fiber forming the frame does not have to extend along the frame and a part of the reinforced fiber may extend along the frame thereby it is possible to achieve an enhancement in flexibility. Here, the extending direction means a direction that the frame part formed with orientation is arranged, and a direction extending along a surface of the frame. Parts of the frame 3 of the fishing line guide according to this embodiment extend and are arranged while having orientation in such a way that the fixing part 6 extends in a forward and backward direction, the connecting part 7 extends in an inclined direction to be distanced upward from the fixing part relative to an axial line X, and the holding part 6 is extended in a ring shape in a surrounding direction. The reinforced fiber according to the embodiment is configured in a bundle state (fiber bundle 10) including a plurality of fibers, and is arranged within a synthetic resin forming the frame to take a role of aggregate so that the frame may be reinforced. That is, the frame 3 according to the present embodiment is formed of a fiber reinforced resin in which the fiber bundle (bundle of reinforced fiber) 10 is continuously arranged along an extending direction of part of forming the frame. Accordingly, the fiber bundle 10 is arranged not to protrude outside the frame 3.

In detail, the fiber bundle 10 of the continuous reinforced fiber passes through one end side (left with reference to the through hole 7A) of the connecting part 7 from the fixing part 6a of one end side (left) with reference to an axial line X as a boundary in the fixing part 6, and is reversely folded as if to surround a circumference of the ring shaped holding part 5a positioned at the surroundings of the opening 5A thereby passing through the other end side (right with reference to the through hole 7A) 7b of the connecting part 7 thereby reaching the fixing part 6b of the other end side (right) without being disconnected. That is, as shown in FIG. 2, the fiber bundle 10 is consecutively arranged along the frame shape, the frame 3 is in a state of being reinforced by the consecutive fiber bundle 10.

Herein, structure of the fiber bundle 10 will be described with reference to FIG. 3.

Figure 3:
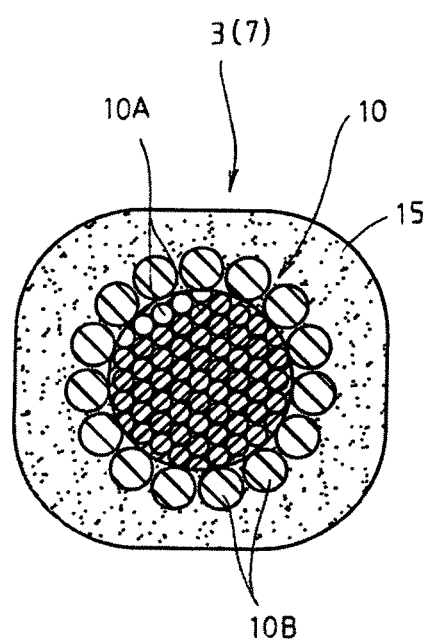
FIG. 3 is a sectional view showing part A of FIG. 2.

FIG. 3 shows a sectional structure of a part (right connecting part) of a predetermined part of the frame 3. As shown in the drawing, an aggregate of the fiber bundle 10 is arranged at the center side of synthetic resin material, and the synthetic resin layer 15 is formed at the surroundings of the fiber bundle 10. The reinforced fiber forming the fiber bundle 10 employs carbon fiber, glass fiber, aramid fiber, etc. The fiber bundle 10 is formed of core fibers 10A arranged in a length direction and surrounding fibers 10B surrounding the core fibers 10A.

The core fiber 10A may be formed with a bundle of a plurality of reinforced fibers, and the surrounding fiber 10B may be arranged in a woven state along a length direction at the surroundings of the core fibers 10A. In this case, the surrounding fiber 10B is formed of one fiber, but, it may be arranged at the surroundings of the core fibers 10A in a bundle state of being integrated with a predetermined number of fibers.

As described above, under the state that the reinforced fiber is formed in a bundle state, the bundle is covered by the synthetic resin layer 15 thereby becoming an aggregate of the frame 3 of fiber reinforced resin so that reinforcement thereof may be achieved. In this manner, if the woven fiber is arranged in the frame, synthetic resin is penetrated in gaps of knitted stitch thereby the fiber can be held strongly thereby making the frame have large rigidity.

Meanwhile, regarding the fiber bundle 10, the frame 3 may be reinforced by one fiber bundle, or, by a plurality of fiber bundles. The fiber bundle 10 may be arranged not only at the center side of the frame 3, but also in the whole of the frame 3, when viewed from a sectional view. In the structure shown in the drawing, although the surrounding fiber 10B of outer side is larger in its diameter than each fiber forming the core fiber 10A, both fibers may have an identical diameter, or the core fiber 10A may be larger in its diameter than the surrounding fiber 10B. Further, the fiber bundle may be formed by arranging in parallel a plurality of reinforced fibers in a length direction, by tangling a plurality of reinforced fibers, or by twisting a plurality of reinforced fibers. The fiber bundle may be formed so that space may be formed between each fiber (such space is filled with synthetic resin forming the synthetic resin layer 15).

In this manner, since a reinforced fiber which is impregnated with synthetic resin is formed in a bundle state, it is easy to treat the fiber and it is possible to easily mold the frame as will be described later. Further, since a plurality of reinforced fibers is arranged windingly thereby getting tangled, an enhancement in flexibility and specific strength is achieved.

The guide ring 20 is formed in a ring shape, and is formed of, for example titanium, aluminum, SUS, ceramics, etc. having a low sliding contact resistance at a fishing line guide surface 20a part as an inner circumference surface thereof. The guide ring 20 is fitted into and fixed to the opening 5A which is formed in the holding part 5 after the frame 3 is integrally formed with the fiber bundle as aggregate.

Next, a method of forming the frame 3 such as type described above will be described with reference to FIG. 4 and FIG. 5.

Figure 4:
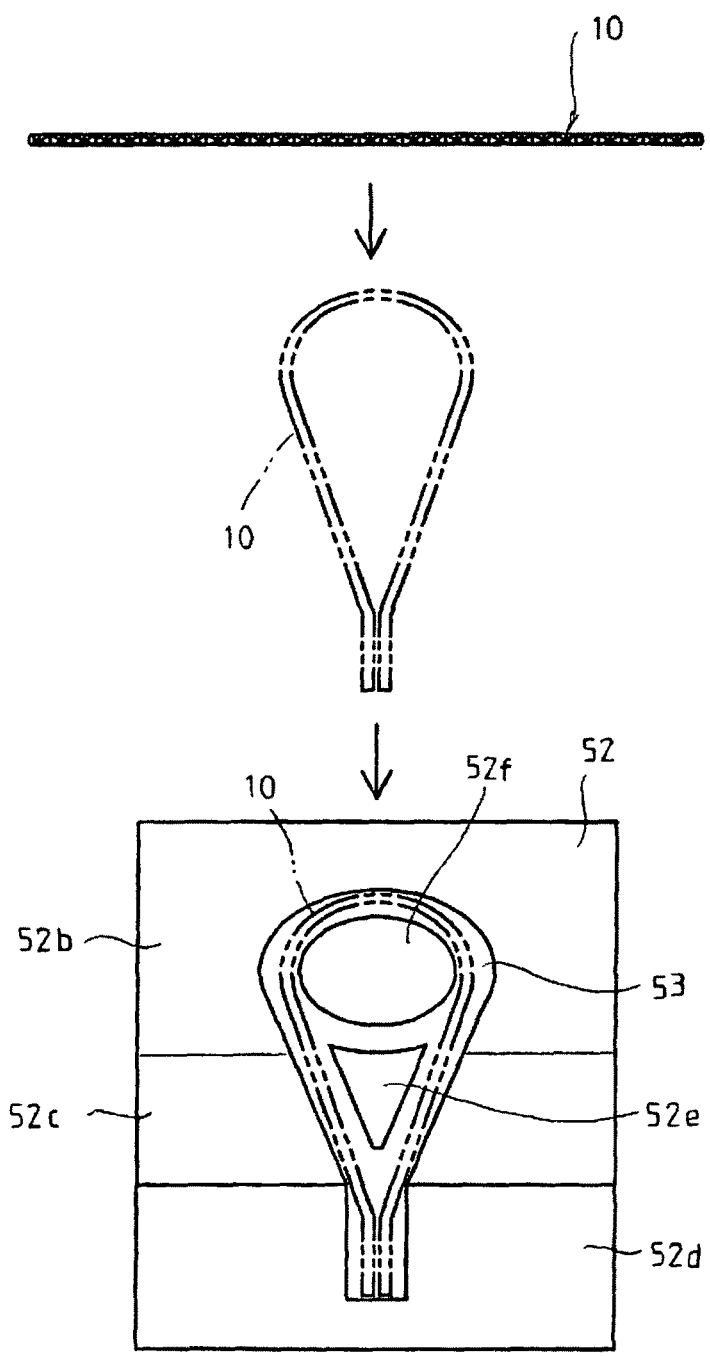
FIG. 4 is a view illustrating a method of molding a frame forming a fishing line guide shown in FIG. 1.
Figure 5:
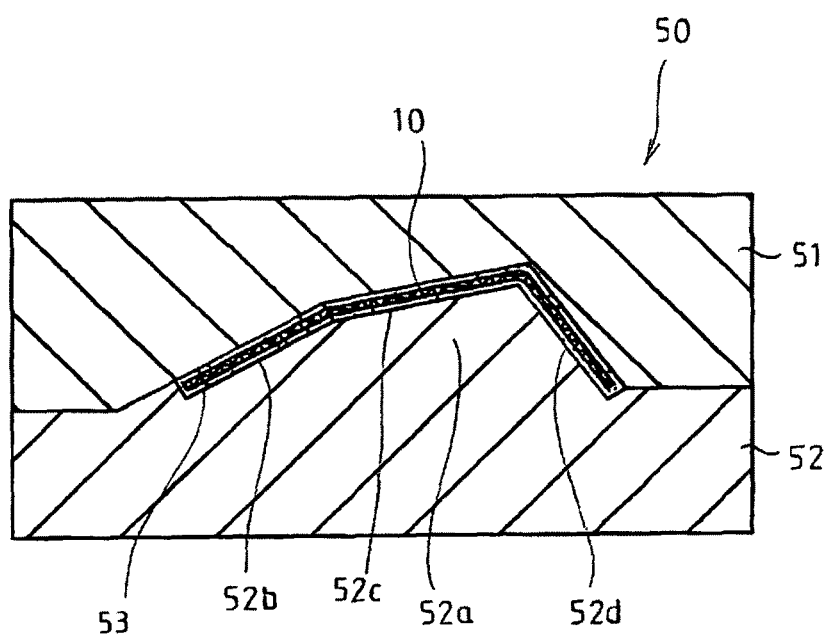
FIG. 5 is a sectional side view illustrating a molded state by a mold shown in FIG. 4.

The frame 3 as shown in FIG. 1 and FIG. 2 can be formed by a mold 50 shown in FIG. 4 and FIG. 5. The mold 50 according to the present embodiment is formed of an upper mold 51 and a lower mold 52 which are separated from each other. FIG. 4 is a schematic view showing the lower mold 52 viewed from an upper side thereof when the lower mold 52 are opened relative to the upper mold 51. In this case, the lower mold 52 is formed thereon with a crest 52a one end surface side of which is a slow inclined surface 52b, 52c, the other end surface side of which is an inclined surface 52d steeper than the slow inclined surface 52b, 52c, and a sectional surface of which is formed approximately in a triangle shape. The fixing part 6 of the frame 3 is formed at the steeply inclined surface 52d side, and the holding part 5 and the connecting part 7 in the frame 3 are formed at the slow inclined surface 52b, 52c side. Meanwhile, the mold 50 is just described as an example, the direction that the mold is separated may arbitrarily be designed in such a manner that the mold is separated in a left and right direction or in a inclined direction.

The lower mold 52 is formed on its surface (a surface of the crest 52a) with a cavity (groove) 53 corresponding to the whole shape of the frame 3. The cavity 53 is formed with a convex part 52e for through hole corresponding to a position of the thorough hole 7A formed in the connecting part 7 and a convex part 52f for opening corresponding a position of the opening 5A for fixing a guide ring formed in the holding part 5.

Regarding the cavity 53 of the lower mold 52, the fiber bundle formed as shown in FIG. 3 is curved to meet an outer shape of the frame 3 as indicated by two-dot chain line of FIG. 4. That is, the end sides of the fiber bundle 10 are folded, and the middle part thereof is formed in a loop shape corresponding to the connecting part 7 and the holding part 5, thereafter, the loop shaped bundle 10 is secured in the cavity 53. At this time, it is preferable that the fiber bundle is impregnated in advance with synthetic resin so that the fiber bundle can be held in its shape when curved before a molding. Thereby, a bending process in which a fiber bundle 10 is set on the frame 3 and a mold receiving process can be easily performed.

In this state, the upper mold 51 is closed relative to the lower mold 52 to thereby form the cavity, and the cavity is filled with thermosetting plastic (for example, epoxy resin) or thermoplastic resin (for example, nylon) as a matrix resin. Thereafter, the matrix resin is hardened thereby it becomes possible to obtain the frame 3 made of fiber reinforced resin. In this case, although the filled matrix resin forms the synthetic resin layer 15 shown in FIG. 3, the matrix resin is in a state that the matrix resin has been penetrated into gaps between each of the fibers of the fiber bundle 10. Meanwhile, during the molding by a mold, the fiber bundle 10 can be held in the mold so that the fiber bundle 10 does not move within the cavity. A pressing piece (not shown) may be prepared so that the upper mold 51 does not only close the cavity but also it gets into the cavity of the lower mold 52 to press the fiber bundle 10 into the cavity.

Meanwhile, after the molded body (frame) is removed from the mold, the molded body may be again molded (doubly molded) by other mold thereby it may make the synthetic resin spread. Thereby, it is possible to enhance rigidity and appearance. The frame 3 obtained from the mold may finely be processed if necessary. Such a fine processing includes, for example, forming the fixing part 6 in a curved shape to easily support the fishing rod, or polishing an end part of the fixing part to easily wind a fishing line or fix the fixing part to the fishing rod.

Next, surface treatment is performed on the frame 3. For example, burr on a surface may be eliminated by performing a barrel process. Sand polishing is performed so that surface gloss may be obtained. The degree of polishing may be controlled by arbitrarily controlling an abrasive or a polishing time according to size, or shape, material characteristic, etc. in the fishing line guide. By performing such barrel processing, it is possible to polish the frame 3 without cutting reinforced fiber, thereby enabling to achieve stabilization in rigidity and making it possible to produce a fishing line guide excellent in an appearance thereof.

Meanwhile, when such a polishing process is performed, it is preferable that polishing is performed so that reinforced fiber may partly be exposed on a surface of the frame 3 and a matrix resin partly remains on a surface of the frame 3. In this manner, it is possible to further enhance a gloss on the surface polished thus.

Next, as occasion demands, the whole or part of the frame 3 may be coated. For example, to enhance an appearance of the frame or to protect a main body of the frame, painting may be performed, or, metal or ceramics deposition may also be performed.

The guide ring 20 is attached to the opening 5A of the holding part 5 of the frame 3 formed as described above. The method of attaching the guide ring 20 may includes a press-in method, an adhesion method, a curling method, and the other fixing method.

Since the fishing line guide 1 formed in such a manner is light-weighted, and excellent in quality, specific strength, specific stiffness, and flexibility compared with metal products, it becomes possible to stably guide the fishing line. For this reason, even though a plurality of fishing line guides are mounted on the fishing rod, the fishing rod does not become heavy thereby enhancing performance of the fishing rod. Particularly, since a lightweight in a base rod is achieved, an angular can sense even a delicate strike (fish bite) thereby it becomes possible to enhance performance of the fishing rod.

Particularly, since a reinforced fiber bundle 10 extending in the same extending direction as described above is arranged in the region of the holding part 5 or in the region of the connecting part 7, flexibility is enhanced thereby the fishing line guide is seldom damaged even though a heavy load is occurred on the fishing line guide when a fishing line is caught in any other obstacles. Even though a big bending stress acts on the fishing line guide because a bending angle is large in the region of being changed from the fixing part 6 to the connecting part 7, the fishing line guide may be prevented from being damaged because it has been reinforced effectively by a reinforced fiber having such orientation characteristic.

Also, according to the manufacturing method as described above, it becomes possible for the reinforced fiber to easily form a fishing line guide extending in an extending direction of the frame.

Meanwhile, in the structure described above, even though the reinforced fiber extending in an extending direction of the frame is not a fiber bundle, reinforced fibers continuous along the frame may be arranged at a distance from each other. Also, reinforced fiber may be arranged along the whole frame without being disconnected, and continuous reinforced fiber may also be arranged along the extending direction according to each part of the holding part, fixing part, connecting part, etc.

Second Embodiment

Figure 6:
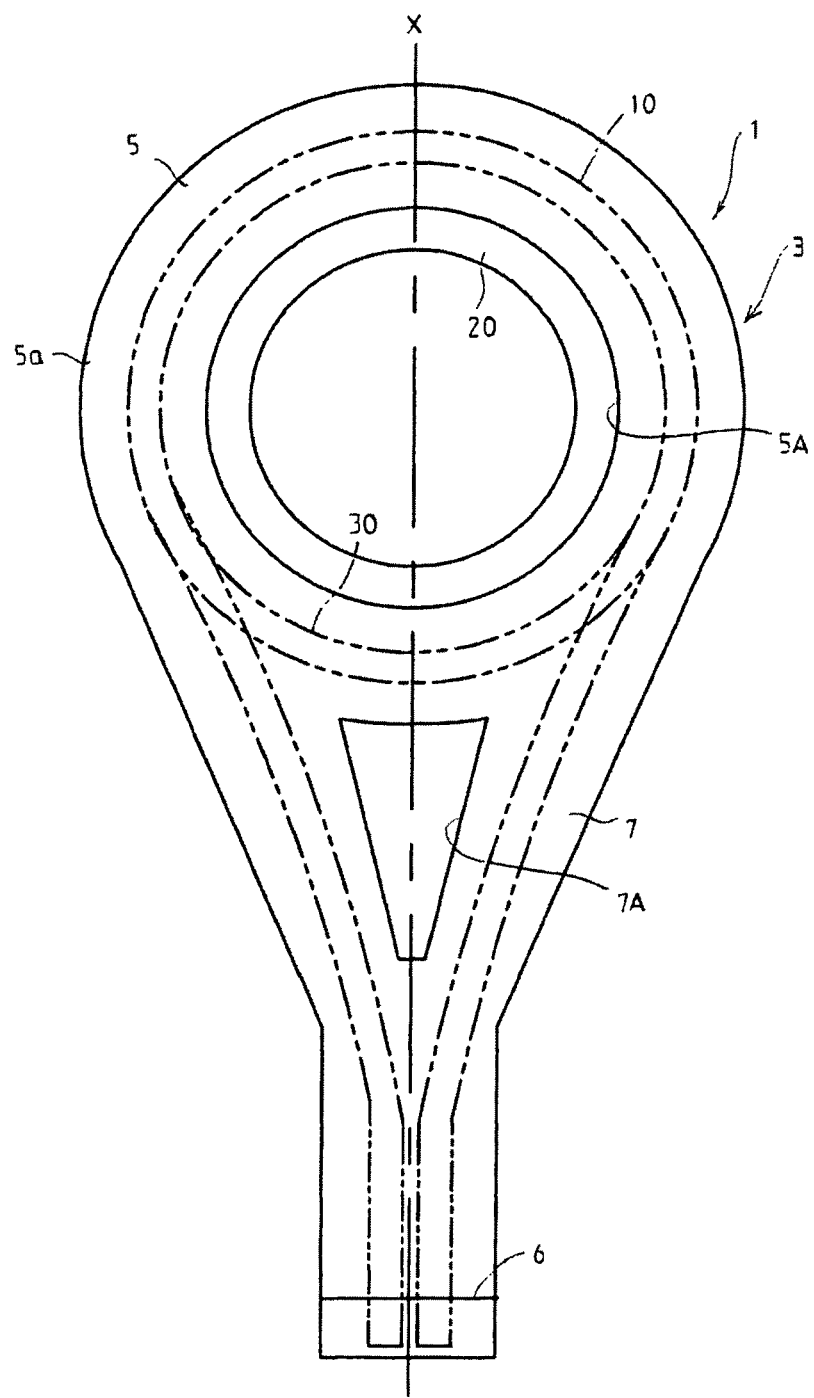
FIG. 6 is a front view showing a fishing line guide according to a second embodiment.
Figure 7:
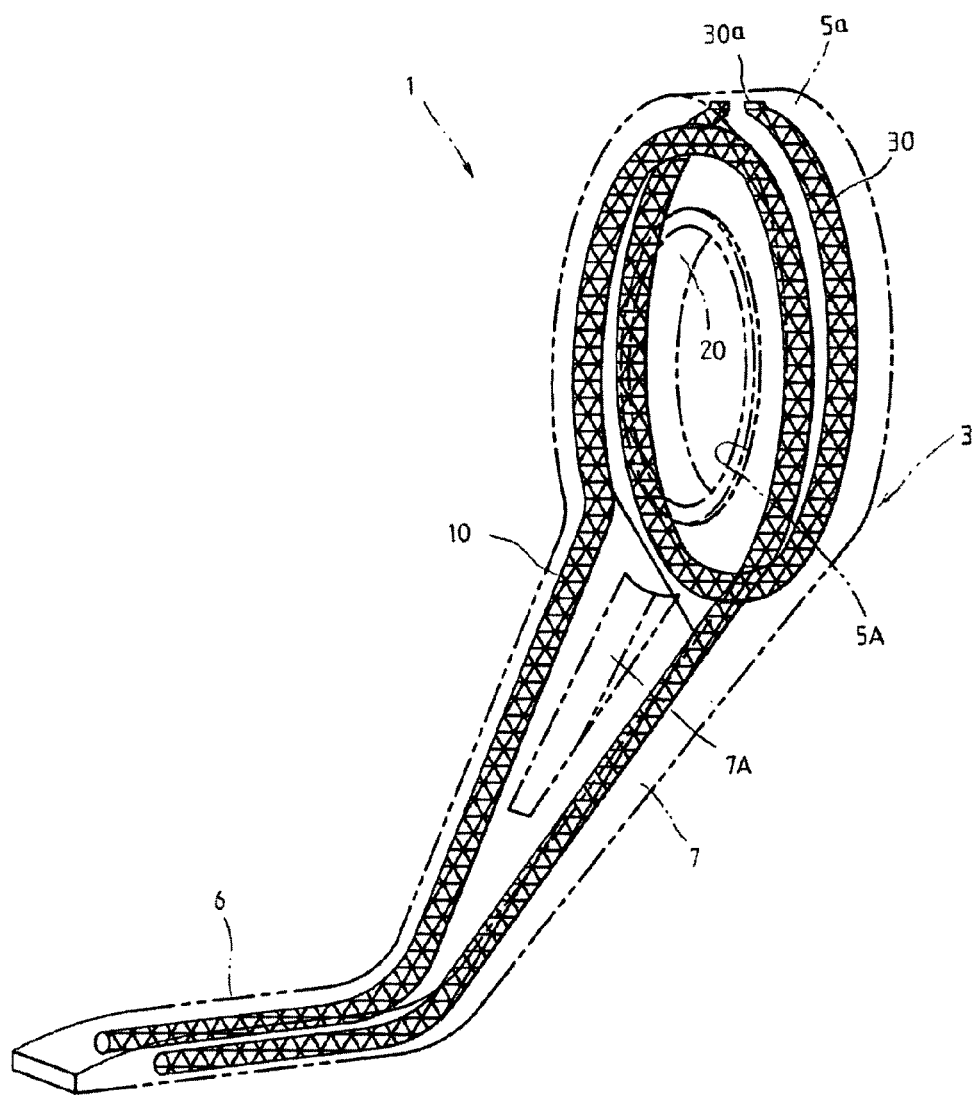
FIG. 7 is a perspective view showing a state of reinforced fiber in the fishing line guide shown in FIG. 6.
Figure 8:
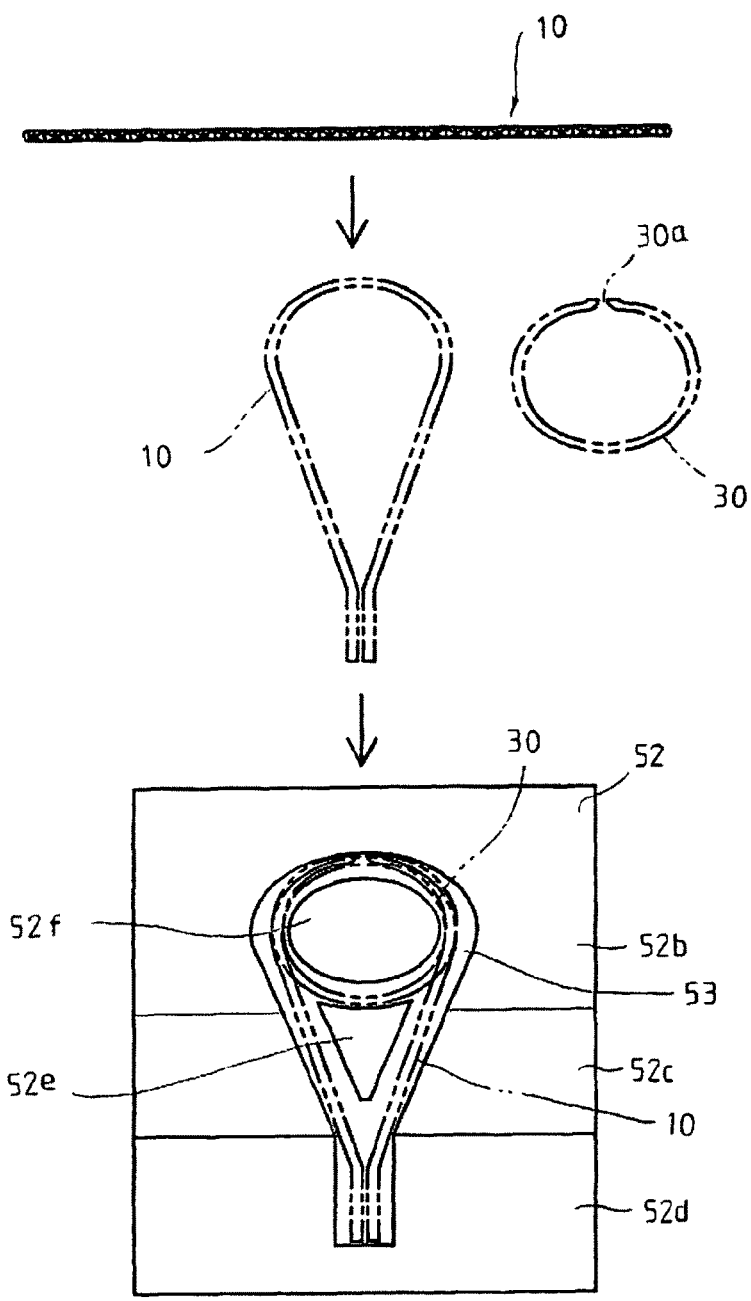
FIG. 8 is a view illustrating a method of molding a frame forming a fishing line guide shown in FIG. 7.

FIG. 6 to FIG. 8 show a second embodiment. FIG. 6 is a front view showing a fishing line guide. FIG. 7 is a perspective view showing a state of reinforced fiber in the fishing line guide shown in FIG. 6. FIG. 8 is a view illustrating a method of molding a frame forming a fishing line guide shown in FIG. 7. Meanwhile, in the preferred embodiment that will be described below, like reference numerals refer to like parts as described in the previous embodiments, and detailed descriptions thereof will be omitted.

According to the present embodiment, the holding part 5, which is formed therein with the opening 5A for fitting the guiding ring 20, is arranged therein with fiber bundle (second fiber bundle) 30 which is in the same ring shape as the ring shaped frame and which is wound one cycle along the ring shaped holding part 5a.

The second fiber bundle 30 may have the same structure as the fiber bundle 10, for example, may be formed in a C shape having a notch 30a or in an O shape having no notch, as shown in FIG. 7 and FIG. 8. The second fiber bundle thus formed is first set in a cavity of the lower mold 52, and then, the first fiber bundle 10 may be set. Alternatively, the first fiber bundle may first be set in a cavity of the lower mold 52, and then, the second fiber bundle 30 may be set.

Alternatively, the first fiber bundle 10 is not only attached to the holding part formation part, but gets tangled with the part of the second fiber bundle 30 while being wound one cycle along the ring shaped holding part 5a. Meanwhile, continuous fiber may be wound not one cycle but more than at least quarter cycle, preferably half cycle along the ring shaped holding part 5a.

Such structure having the same effect as in the embodiment described above, and at the same time, to obtain a fishing line guide that is excellent in rigidity because the fishing line guide is made of the fiber reinforced resin having therein a reinforced fiber continuous along the frame. Particularly, since a guide ring 20 coming into sliding contact with a fishing line is mounted in the ring shaped holding part 5a, it becomes possible to reinforce the ring shaped holding part 5a by which the fishing line guide is frequently caught.

Figure 9:
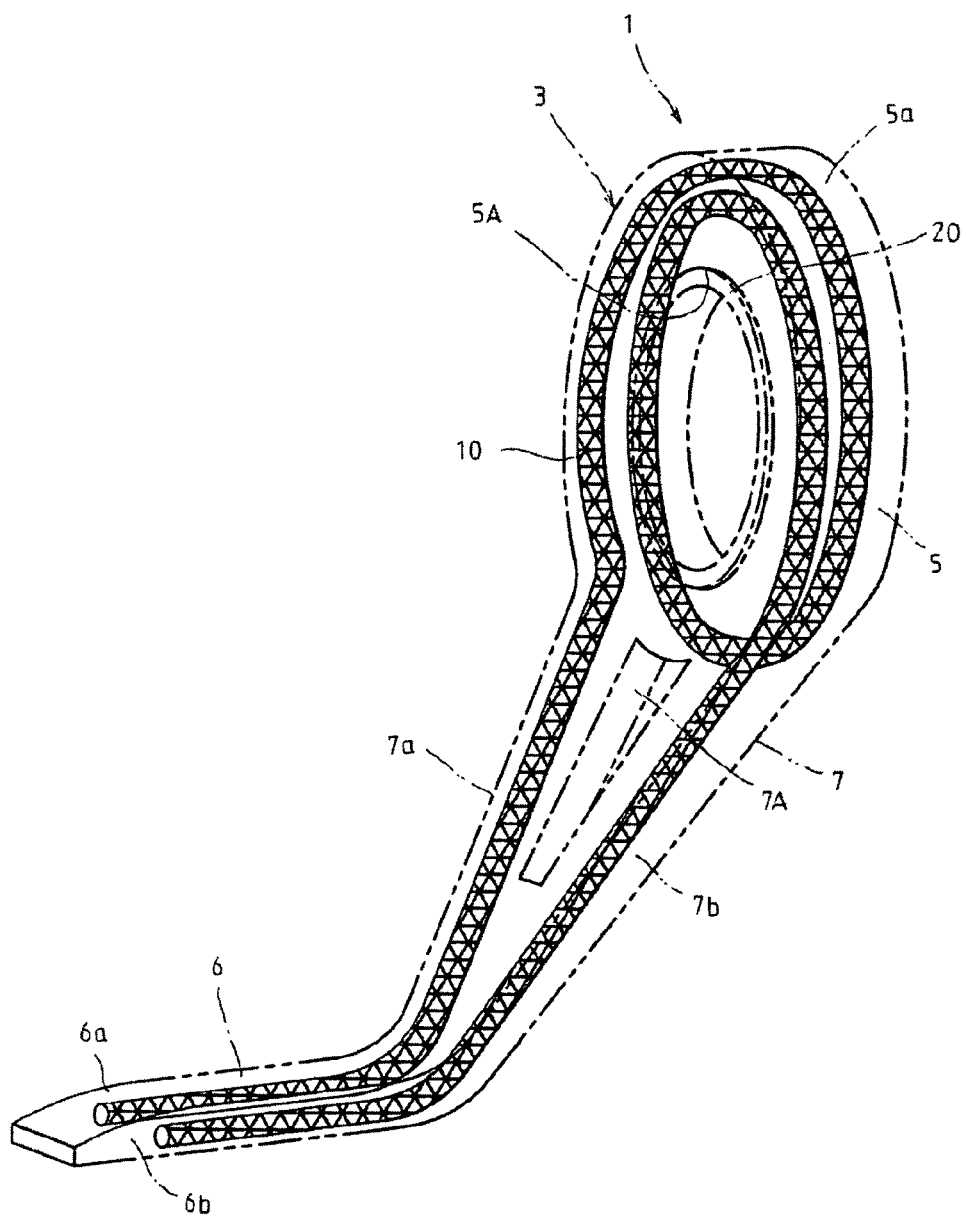
FIG. 9 is a view showing an arrangement of reinforced fiber shown in FIG. 7 according to an illustrative modification.

FIG. 9 is a view showing an illustrative modification of an arrangement shown in FIG. 7.

According to the illustrative modification, when the ring shaped holding part 5a is formed, the second fiber bundle 30 is not arranged separately in the member 5a, but the fiber bundle 10 according to the previously described first embodiment is arranged lengthily and wound one cycle in the ring shaped holding part 5a part. That is, the fiber bundle 10 passes through one end side 7a (left with reference to the through hole 7A) of the connecting part 7 from the fixing part 6a of one end side, is reversely folded so as to be wound one cycle along the ring shaped holding part 5a surrounding the opening 5A, passes through the other end side 7b (right with reference to the through hole 7A) of the connecting part 7, and finally reaches the fixing part 6b of the other end side.

Even by such structure, it becomes possible to obtain the same effect as the second embodiment described previously. Meanwhile, in the second embodiment or the illustrative modification, the ring shaped holding part 5a may additionally be reinforced. For example, a fiber bundle such as the second fiber bundle 30 may additionally be arranged, or the fiber bundle 10 may be wound more than 2 cycles.

As described above, although preferred embodiments have been described, the present invention is not limited to the structure described above, but may be modified diversely.

According to the present invention, in the frame part forming the fishing line guide 1, it is preferable that a reinforced fiber forming a fiber reinforced resin is extending in an extending direction of the frame. For this reason, the reinforced fiber may not be formed in a bundle state. The present invention is not limited to the structure and arrangement such as sort, modulus of elasticity, amount of impregnated resin, diameter, etc. of reinforced fiber extending in an extending direction of the frame, which are described according to preferred embodiments, but it may be modified diversely.

Although the preferred embodiment includes the structure (the structure provided with the fixing part 6) in which the fishing line guide 1 is fixed to a fishing rod by means of a line fixing tool and the like, it may include the structure in which a movable guide is fitted to an outer side of a fishing rod so as to be in a sliding contact with the fishing rod. Also, the present invention may include the frame 3 having no connecting part 7.

Third Embodiment

Figure 10:
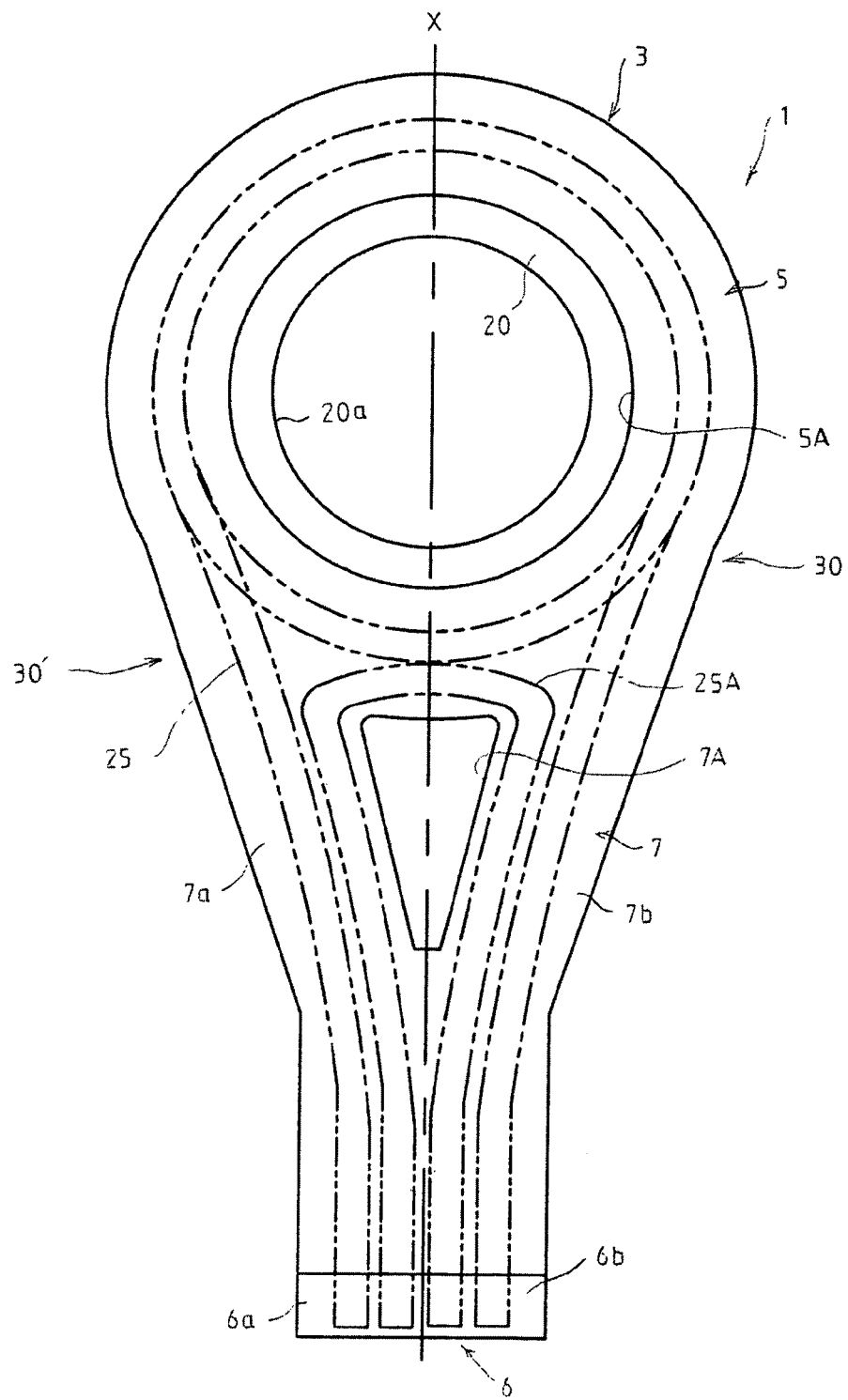
FIG. 10 is a front view showing a fishing line guide according to a third embodiment.
Figure 11:
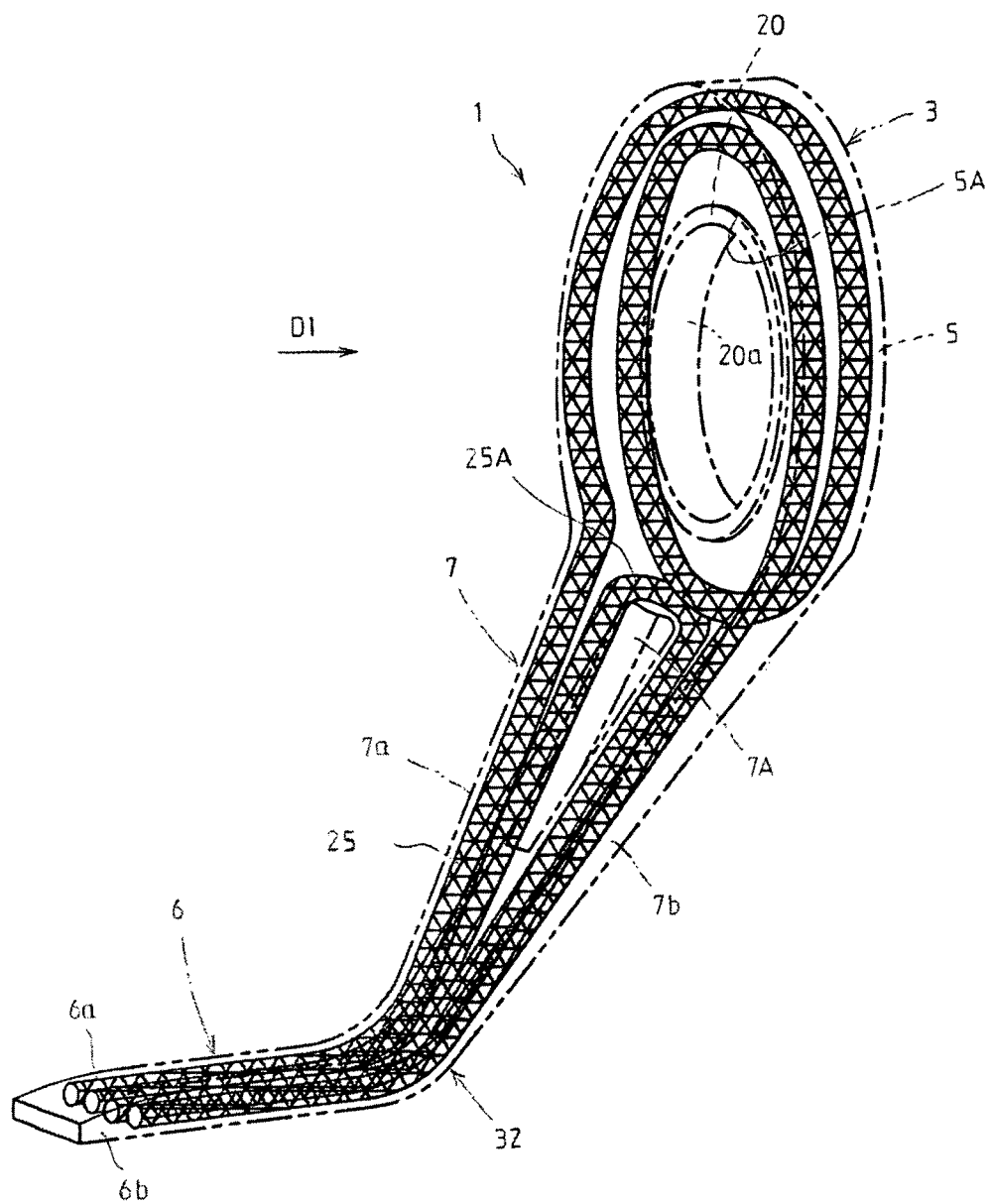
FIG. 11 is a perspective view showing an illustrative arrangement of fiber reinforced synthetic resin material forming a frame in the fishing line guide shown in FIG. 10.

A fishing line guide according to a third embodiment will be described with reference to FIG. 10 and FIG. 11. In these drawings, FIG. 10 is a front view of a fishing line guide, and FIG. 11 is a perspective view showing an illustrative arrangement of fiber reinforced synthetic resin material forming a frame in the fishing line guide shown in FIG. 10. Meanwhile, the direction of arrow D1 shown in FIG. 11 is identical to an axial direction of the fishing rod when the fishing line guide is mounted on the fishing rod, and the fixing part at a butt rod side is mounted on the fishing rod (FIG. 10 is a view when FIG. 11 is viewed from the direction of arrow D1). Hereinafter, a front side (forward side) means a base rod side and a rear side (backward side) means a base end side (butt rod side). A left and right direction means a left and right direction relative to an axial line X when the frame is viewed from arrow D1.

The fishing line guide 1 is provided with the frame 3 made of a synthetic resin impregnated reinforced fiber, a so called fiber reinforced synthetic resin. The frame 3 includes a ring holding part 5 holding a guide ring 20 through which a fishing line is inserted and passes, and a connecting part 7 which is integrally formed at a downward side (fishing rod side) of the ring holding part 5 and is formed at the center thereof with an opening 7A. The frame 3 according to the present embodiment is provided with a fixing part 6 for fishing rod attachment which is curved at the end (lower end) of the connecting part 7 and which is to be fixed to a surface of the fishing rod by means of quill, adhesion, etc. and the frame 3 is provided with the connecting part 7 in which the opening 7A is formed between the ring holding part 5 and the fixing part 6. That is, the fixing part 6 is integrally formed by bending the end of the connecting part 7 toward the base end side. Meanwhile, the connecting part 7, as shown in FIG. 11, is raised obliquely upward from the fixing part 6 thereby preventing the fishing line from getting tangled.

A fishing line, which is inserted into and passes through the ring holding part, secures a predetermined gap formed therebetween with an outer surface of the fishing rod by forming the connecting part 7 between the ring holding part 6 and the fixing part 6. Meanwhile, in the fixing line guide according to the present invention, if the connecting part 7 can guide the fishing line at a distance from the surface of the fishing rod, the connecting part is not limited in the length thereof in an x direction. That is, even though the frame is a type in which a fixing part 6 fixed to a surface of a fishing rod does not exist, for example, a structure having a short distance between interlocking members in which a fishing rod is fitted, like a movable guide (see FIG. 21), the frame 3B is configured to have a connecting part 97 positioned between the ring holding part 5 and a surface of the fixing rod.

The ring holding part 5 is formed in a plate shape wider in a left and right direction than the thickness in a forward and backward direction, and is formed at the center region thereof with an opening 5A for fitting the guide ring 20. The opening 5A may be integrally formed when the frame 3 is molded by a mold. The connecting part 7 is formed with a through hole 7A to have bilateral symmetry at a position including an axial line of the center thereof. The connecting part 7 is formed of a pair of protrusions left and right with branch members 30, 30' from the ring holding part 5, thereby enabling to achieve a light weight in the frame part (through hole may not be formed).

The guide ring 20 is formed in a ring shape, and is formed of materials, for example, such as titanium, aluminum, SUS, ceramics, etc. having a low sliding contact resistance at a fishing line guide surface 20a part as an inner circumference surface thereof. The guide ring 20 is fitted into the opening 5A which is formed in the ring holding part 5 when the frame 3 is integrally formed with a fiber bundle as will be described thereby being fixed thereto. For example, a guide ring is in advance arranged in an inner side of a part forming a ring holding part, the frame mounted therein with the guide ring may be integrally formed by heating and molding a fiber reinforced synthetic resin material reeled in an outer circumference (method thereof will be described later). Alternatively, the frame having an opening is firmed first, and then a guide ring may be fitted into the opening to thereby be fixed thereto. Meanwhile, the guide ring 20 as a separate member may not be configured to be fitted into the opening 5A. That is, in addition to the structure in which the ring holding part 5 is mounted therein with the guide ring 20 as a separate member, the ring holding part 5 itself may be processed thereby forming therein a through hole for inserting a fishing line therein without attaching thereto the guide ring as a separate member.

The frame 3 is formed of a fiber reinforced synthetic resin material. The fiber reinforced synthetic resin material is made by integrally molding a matrix material impregnated reinforced fiber. The matrix material is a structure (fiber reinforced synthetic resin) in which a synthetic resin made of thermosetting resin, or thermoplastic resin is used. In this case, the reinforced fiber is formed of a fiber bundle which will be described later, and it is preferable that the frame 3 includes at least partly a fiber reinforced material formed of the fiber bundle (the whole frame may be formed of a fiber reinforced material formed of a fiber bundle).

The reinforced fiber (separate reinforced fiber forming a fiber bundle) forming the fiber reinforced synthetic resin material may employ, for example, highly elastic fiber such as carbon, glass, boron, etc. and metal fiber such as SUS, titanium alloy, NT alloy, etc. The matrix material forming a fiber reinforced synthetic resin material together with a reinforced fiber may employ a thermosetting resin or a thermoplastic resin. In this case, the thermosetting resin may employ an epoxy resin, a phenol resin, a cyanate resin, a polyether resin, a vinyl ether resin, acryl resin, melamine resin, a urea resin, etc. In addition, the thermoplastic resin may employ an adhesive rubber based resin, an acryl based resin, an acryl based resin, a polyamide based resin or a polysulfide resin, a thermoplastic epoxy resin, etc. and may employ a hot melt type polyolefin based resin, a polyester resin, a polyamide resin, an acryl resin, a urethane resin, a styrene-isoprene-styrene block copolymer or ethylene-polyvinyl acetate copolymer, etc.

The fiber bundle is an aggregate forming the frame formed to have continuity as a single or a plurality of reinforced fibers, may have various thicknesses according to each frame, and may include a fiber bundle formed in a string shape by arranging in parallel or a braided fiber bundle. It is preferable that the fiber bundle may include a reinforced fiber extending in an extending direction at a part of forming the frame. Here, the extending direction means a direction extended in a direction of including a surface forming the frame. It is preferable that at least in a part (ring holding part 5, connecting part 7, fixing part 6, or, a part of connecting these) of the frame, the reinforced fiber extends in an extending direction of each part of the frame. For example, the ring holding part 5 of the frame is extended and arranged in a ring shape surrounding the opening member 5A, and a reinforced fiber or the fiber aggregate thereof is arranged to extend along a ring shape (curved shape) corresponding with the shape of the ring holding part 5. Likewise, the connecting part 7 is arranged so as to be extended in a direction being distanced in a left and right direction upward the axial line X. since the fixing part 6 is extended and arranged in a forward and backward direction, the reinforced fiber or the fiber aggregate is arranged to extend along each of the extending directions.

In detail, the reinforced fiber forming the fiber reinforced synthetic resin material may include long-fiber, which may be called filament, (at least 10 mm, or more than ¼ circumference, preferably ½ circumference, of ring holding part circumference, length of more than ½ of connecting part) so that the above-mentioned part of the frame or the whole structure thereof may be integrally formed, and it is preferable that all reinforced fibers forming a fiber reinforced synthetic resin material (fiber bundle) consist of long-fiber. For example, in the frame structure, in a case where such a fiber reinforced synthetic material is applied to the ring holding part 5 or the connecting part 7, it is preferable that the fiber reinforced synthetic material is continuously arranged in a circumferential direction on a whole circumference of the ring holding part 5. It is also preferable that the reinforced fiber is arranged continuously on a circumference of more than ¼ of the whole circumference in order for the property of the long fiber to be exhibited effectively. Further, it is preferable that the connecting part 7 is arranged throughout the whole length thereof with the long fiber and it is also preferable that the reinforced fiber is arranged continuously more than ½ of the whole length in order for the property of the long fiber to be exhibited effectively.

It is preferable that an amount of the impregnated synthetic resin is 35 weight %±15 weight % in the fiber bundle part. In this case, it is possible to partly allocate a relatively large amount of resin to a branch part, or an outer layer part of a sectional shape, which will be described later. Further, it is preferable to allocate a larger impregnated amount of synthetic resin in an entire frame or each part (any one of ring holding part 5, connecting part 7 and fixing part 6) than the impregnated amount of synthetic resin in a rod pipe part of a fishing rod which is attached thereto with a fishing line guide, thereby the number of voids is reduced, solidity is stabilized by preventing interlayer shear from being occurred, and surface fiber is protected.

Here, the structure of fiber bundle used when the frame is formed will be described in detail. It is preferable that the fiber bundle is arranged therein with a reinforced fiber of long fiber described above along an axial direction in a state that a synthetic resin is impregnated, for example, it is possible to form dozens of reinforced fibers in a bundle state along an axial direction. That is, it is possible to form the fiber bundle as shown in FIGS. 12A to 12G.

FIG. 12A shows the fiber bundle 25 formed by forming dozens of reinforced fibers (fiber bundle) 25a in a bundle state along an axial direction. FIG. 12B shows the fiber bundle 25 formed by forming dozens of reinforced fibers (fiber bundle) 25a formed of long-fibers in a bundle state along an axial direction, and at the same time, by twisting the whole bundle. FIG. 12C shows the fiber bundle 25 formed by braiding dozens of reinforced fibers (fiber bundle) 25a formed of long-fibers in a braid shape or in a braid thread shape along an axial direction. FIGS. 12D and 12E show the fiber bundle 25 formed by winding or braiding the reinforced fiber 25a in a circumferential direction or in a crossed spiral shape on the circumference of the core 25b (which may be formed, for example, by bundling a number of reinforced fibers, or by forming separate members (for example, hollow material or foam material, and determined randomly in the material, form, thickness, etc.)) extended in an axial direction. Meanwhile, in FIGS. 12B to 12D, the reinforced fiber may be formed with single-yarn.

FIG. 12F shows the fiber bundle 25 formed by cutting in a predetermined width and winding a sheet type member (prepreg sheet 25c) in which a synthetic resin is impregnated a number of reinforced fibers arranged side by side. FIG. 12G shows the fiber bundle 25 formed by stacking a plurality of prepreg sheets 25c cut in a narrow width. In this manner, the fiber bundle 25 may be formed by winding the prepreg sheet having reinforced fibers mixed in an axial direction, or by stacking a number of the sheets, or in a tape shape.

As described above, in the fiber bundle 25 forming the frame of the fishing line guide, it is preferable that the reinforced fiber extends toward an axial direction, and the fiber bundle 25 is not limited to a specific structure in a sectional shape or thickness thereof, the relation between reinforced fibers forming the fiber bundle. That is, the fiber bundle 25 may be formed in various aspects such as a plurality of reinforced fibers arranged side by side in a length direction, a plurality of reinforced fibers tangled from each other, single-yarns braided, etc. Alternatively, the fiber bundle may be formed by mixing fiber of thermoplastic resin material (for example, polyamide resin, acryl resin, etc) with reinforced fibers (for example, carbon fiber, glass fiber, etc.). The final frame may be formed in combination with the structure shown in FIGS. 12A to 12G.

In this embodiment, the connecting part 7 and the ring holding part 5 forming the frame 3, and the fixing part 6 are formed by a continuous arrangement of the fiber bundle 25, as shown in FIG. 11. In detail, the fiber bundle 25 passes through one end side (left with reference to the through hole 7A) of the connecting part 7 from the fixing part 6a of one end side (left) with reference to the axial line X, is reversely folded so that the fiber bundle 25 may be wound (wound more than one cycle in FIG. 11) on the circumference of the ring shaped ring holding part 5 surrounding the opening 5A, passes through the other end side (right when viewed from the through hole 7A) of the connecting part 7, and finally reaches the fixing part 6b of the other end side (right side). That is, the reinforced fiber 25a forming the fiber bundle 25 is arranged so as to extend in the extending direction from the fixing part 6 to the connecting part 7 (alternatively, from the connecting part 7 to the fixing part 6), and is wound on the circumference of the ring holding part thereby being continuously arranged along the whole frame. Thereby, the frame 3 is reinforced by the reinforced fiber 25a of the continuous fiber bundle.

Further, in the region from the fixing part 6 to the connecting part 7, a separate fiber bundle 25A is arranged in addition to the fiber bundle 25. In detail, the fiber bundle 25A passes through one end side 7a (left when viewed from the through hole 7A) of the connecting part 7 from the fixing part 6a with reference to the axial X, and is reversely folded at the upper portion of the through hole 7A thereby becoming a parallel arrangement state partly with the fiber bundle 25 at the region of the opening 5A of the ring holding part. In succession, the fiber bundle 25A passes through the other end side 7b (right when viewed from the through hole 7A) of the connecting part 7 to reach the fixing part 6b of the other end side (right).

As described above, the reinforced fiber 25a forming the fiber bundle 25, 25A is continuously arranged in the ring holding part 5, connecting part 7 and fixing part 6 that form the frame 3, thereby enabling to achieve a lightweight of the fishing line guide and an enhancement in flexibility and making it possible to have a structure excellent in specific strength and specific stiffness. However, when the frame 3 is formed, as described above, all reinforced fibers need not to be continuously arranged. That is, the frame 3 may include a part in which the fiber bundle is not arranged. The extending direction of the reinforced fiber 25a or the amount of fiber may be controlled arbitrarily when the fiber bundle is formed, and it is possible to arbitrarily select the kind or the shape of the reinforced fiber according to each arrangement or shape of the frame. Further, as described above, the reinforced fiber extending in the extending direction of the frame 3 may be occupied more than ⅓ by a ratio of the reinforced fiber extending in the extending direction when viewed from the sectional surface (it may be everywhere the reinforced fiber is arranged), more preferably, more than ½ so that the flexibility may be enhanced and specific strength and specific stiffness may be improved.

Figure 21:
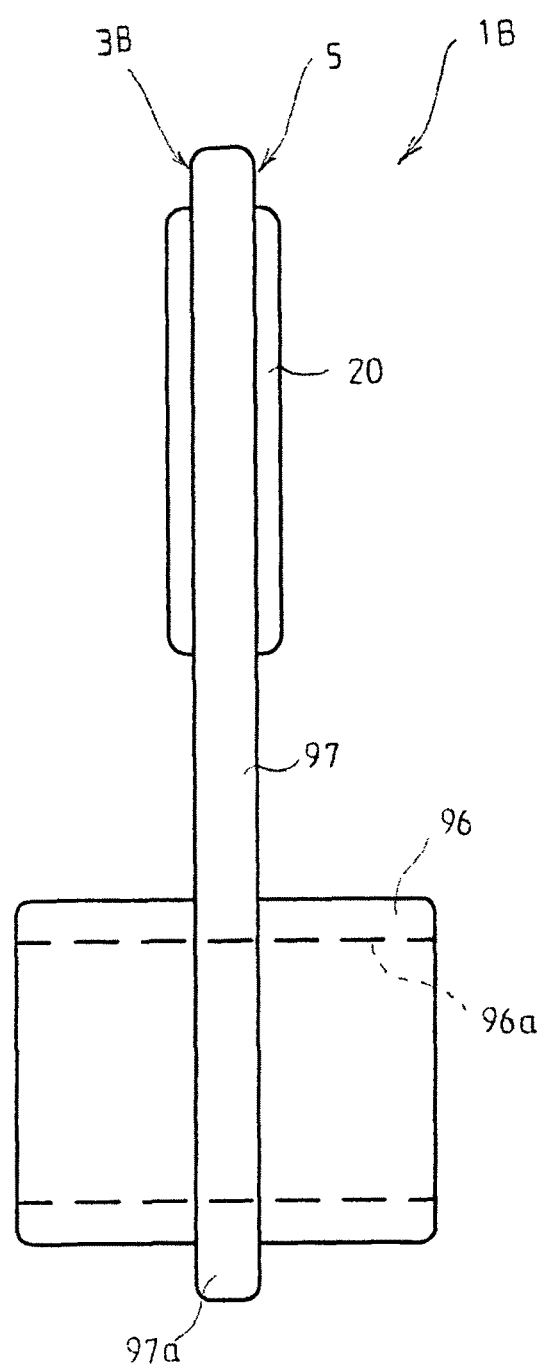
FIG. 21 is a side view showing a fishing line guide according to a fifth embodiment.

In this embodiment, the fixing part 6 includes a lower surface side used as a support surface for supporting a surface of the fishing rod, and is fixed to a surface of the fishing rod as a fishing line guide by means of quill, adhesion, etc. It is preferable that such fixing part 6 is integrally formed together with the frame thereby enabling lightweight and high modulus. Meanwhile, the fixing part may be formed with a separate material, and such fixing part may be used to fix the frame structure having the connecting part 7 and the ring holding part 5. As shown in FIG. 21, even in a case where the fishing line guide 1B is configured as a movable guide, the fixing part 96 (in this case, the fixing part is a cylindrical shape having a through hole 96a detachably engaged with a rod pipe of the fishing rod; becoming a fixing tub) is formed with a separate synthetic resin, and the resultant structure may be attached to the frame structure as described in the foregoing. Of course, the fixing tub 96 may be integrally formed with the fixing part 97a formed integrally with the connecting part 97.

The frame 3 formed with the fiber bundle 25 as described above will be described according to a further preferred embodiment.

Figure 13:
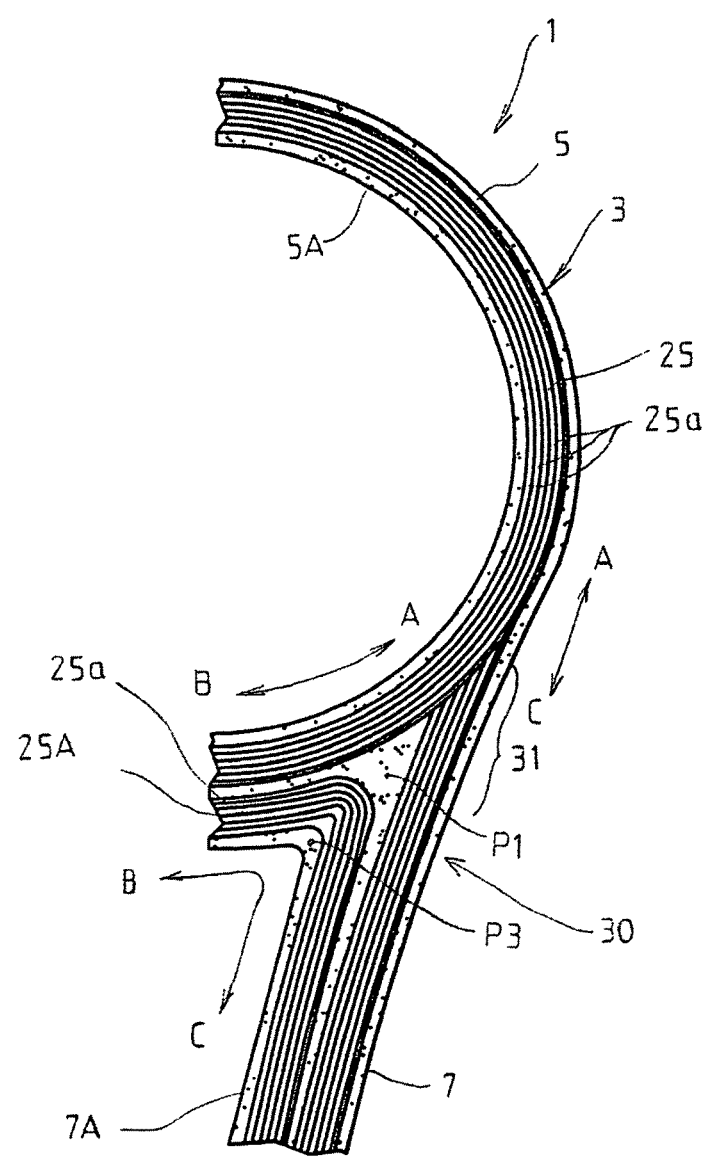
FIG. 13 is an enlarged view showing a branch part of a ring holding part and a connecting part.

Since the frame 3 has the ring shaped ring holding part 5 and the connecting part 7, as enlarged and shown in FIG. 13, it is configured to have a branch divided in a different direction. That is, the frame 3 is configured to be divided in directions different from each other at the intersection (denoted by a branch 30) of the ring shaped ring holding part 5 and the connecting part 7. It is preferable that such branch 30 is configured to have a reinforced fiber extended from a branch direction of one side toward a branch direction of other side or toward other branch direction. In detail, in the structure of this embodiment, it is preferable that the reinforced fiber of the fiber bundle is arranged so that the branch may be extended from a direction of one side toward branch directions different from each other, like an A-B direction (corresponding to the reinforced fiber 25a of the fiber bundle 25), a B-C direction (corresponding to the reinforced fiber 25a of the fiber bundle 25A) and an A-C direction (corresponding to the reinforced fiber 25a of the fiber bundle 25).

In this manner, since the reinforced fiber is arranged to be extended at the branch, it is possible to enhance the rigidity of the branch. Meanwhile, such a branch is not limited to the position shown in FIG. 13, but may be formed at various positions. For example, according to a fourth embodiment which will be described later, in the fishing line guide (see FIG. 20) as a type having two legs, although the ring holding part 5 is formed at a lower end part thereof with a branch 30A extended from one side toward directions different from each other, it is preferable that the reinforced fiber of the fiber bundle is arranged so that the branch 30A may also be extended from a direction of one side toward branch directions different from each other, like a D-E direction (corresponding to the reinforced fiber 25a of the fiber bundle 25), a E-F direction (corresponding to the reinforced fiber 25a of the fiber bundle 25B) and a D-F direction (corresponding to the reinforced fiber 25a of the fiber bundle 25C).

In the structure described above, it is preferable that the branches 30, 30A each have a part which is higher in the ratio of synthetic resin (weight %) than the connecting part 7, 57, 58. In detail, in the structure shown in FIGS. 13 and 20, the center parts P1, P2 of the branches 30, 30A correspond to the part (part of high synthetic resin ratio). In the structure shown in FIG. 13, the part P3 of the side at which the through hole 7A is formed correspond to the part (part of high synthetic resin ratio). In such a manner, it is possible to lower relatively the rigidity at the branch by increasing the ratio of the synthetic resin at the parts. That is, by lowering the rigidity at the part a width of which is relatively wide like the branch, it may prevent loads from being concentrated at the part a width of which is relatively narrow like the connecting part or the ring holding part, etc. thereby the frame in whole may be improved in its stiffness balance and strength balance.

To improve the stiffness balance and strength balance of the frame in whole, besides the above mentioned structure, it is preferable that the center parts P1, P2 of the branches 30, 30A have a relatively higher ratio (more than 10 weight %) of synthetic resin than the outer parts 31, 31A of the frame at the same position thereof. Also, it is preferable that the center part P1, P2 have more than 10 weight % by a ratio of synthetic resin than the ring holding part. Or, it is preferable that the center part P1 of the branch 30 has a higher ratio of synthetic resin than the part P3 in which the through hole 7A is formed. As described above, in the structure in which the through hole 7A is formed at the branch 30, the part P3 of the through hole side may have a higher ratio of synthetic resin than the outer part 31 of the branch 30, or may have a higher ratio of synthetic resin than the ring holding part 5.

That is, the center part P1 of the branch 30, or the part P3 at which the through hole is formed has a higher ratio of synthetic resin than the reinforced fiber, or a relatively higher ratio (for example, more than 35 to 65 weight %) of synthetic resin than the other parts, thereby it is possible to enhance stiffness balance and strength balance in the frame in whole.

As shown in FIG. 11, in the structure that the frame is formed therein with the fixing part 6 fixed to a surface of the fishing rod, although the curved portion 32 is formed between the connecting part 7 and the fixing part 6, it is preferable that an amount of reinforced fiber of the curved portion 32 is greater than that of the connecting part 7. Thereby the reinforced fiber at the curved portion stressed can be effectively prevented from peeling or being damaged. Meanwhile, besides applying plenty of reinforced fibers to the curved portion 32, this part may have plenty of synthetic resins in the ratio (weight %) compared with the connecting part 7, or may be formed thicker than the connecting part 7, or may be formed wider in its sectional area than the connecting part 7. The curved portion 32, or a curved portion including a part of the fixing part and the connecting part may have a reinforcement layer formed by attaching thereto resin sheet, prepreg sheet, metal sheet, etc.

The fixing part (particularly, a curved portion side of fixing part), which is formed at portions connecting a curved portion and another curved portion, may be formed in combination with any one or two more among the following A) to B). That is, A) making the amount of reinforced fiber of a curved portion or a fixing part greater than the amount of reinforced fiber of a connecting part (part having the lowest amount of fiber) of at least one side, B) preferably making the ratio (weight %) of synthetic fiber higher than the connecting part, but, in a case where the amount of fiber is large, making the ratio of synthetic resin reduce and set arbitrarily, C) making the thickness thereof thick (preferably, thicker more 10% than the connecting part), D) making the sectional area large (in a case where the connecting part is divided into a plurality of connecting parts, preferably, making the sectional area larger than the total area of the plurality of connecting parts).

As described above, it is possible to prevent the reinforced fiber in the region of the fixing part at positions continuously connecting a curved portion and another curved portion from peeling or being damaged. Also, a reinforcement layer may be formed throughout the curved portion and the connecting part (curved portion side) from the fixing part (curved portion side), thereby it is possible to prevent the reinforced fiber at this portion from peeling or being damaged.

Further, it is preferable that the fixing part 6 has a larger amount of reinforced fiber than the connecting part 7 or one end side (7a or 7b) of the connecting part. That is, the fixing part 6 is configured to have a relatively larger amount of reinforced fibers, thereby preventing the fixing part from being damaged causing a decrease in an inherent strength of fixing part of quill and the like and enhancing a strength valance as whole. Meanwhile, it is preferable that the amount of reinforced fiber of the fixing part is large like the curved portion of the fixing part, but the amount of reinforced fiber may be reduced at the opposite side of the curved portion. The fixing part as a whole may have a smaller amount of reinforced fiber than the curved portion (particularly, reinforced fiber having a length direction) thereby it is possible to enhance the flexibility of the fishing rod.

Figure 20:
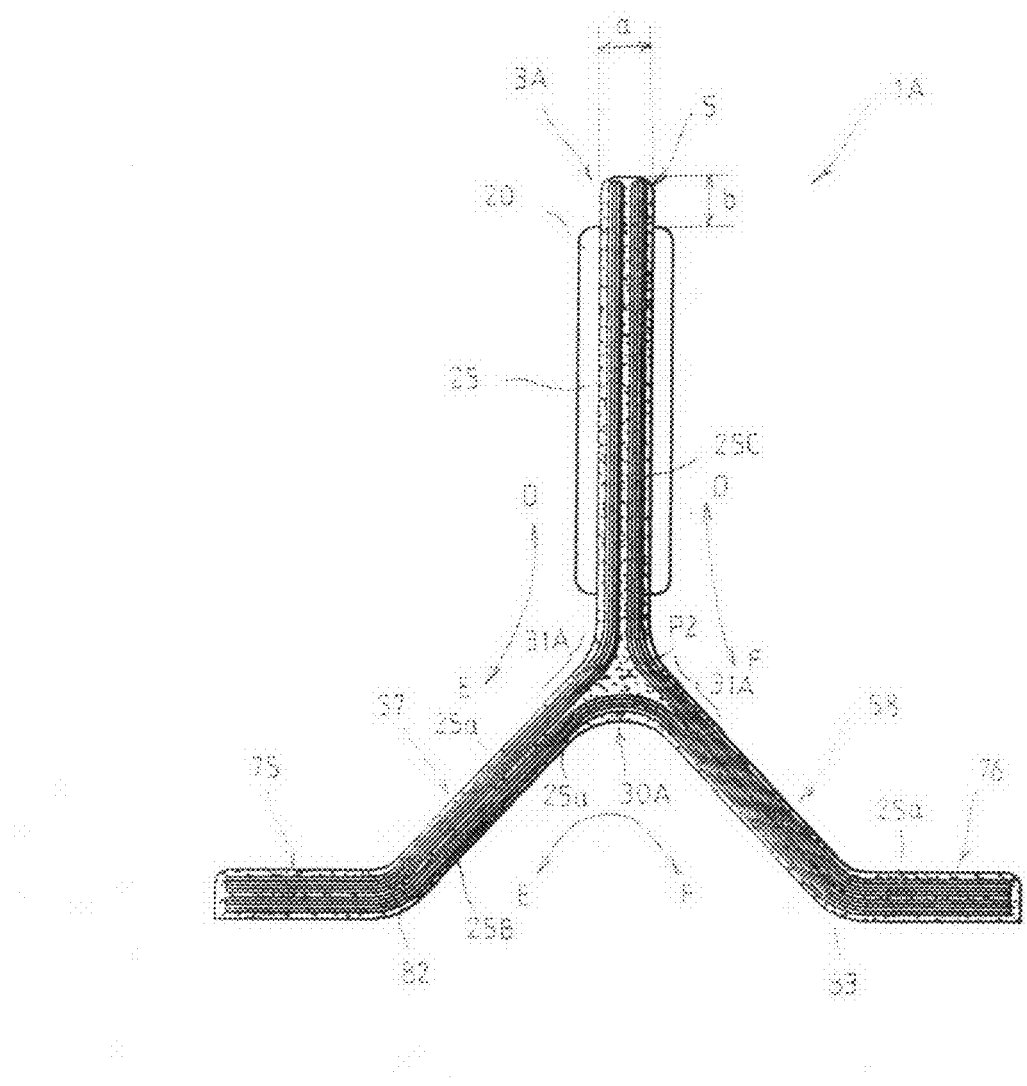
FIG. 20 is a side view showing an orientation direction of a reinforced fiber in a fiber reinforced synthetic resin material of the fishing line guide according to a fourth embodiment.

Meanwhile, the structure described above may also be applied to the fishing line guide type shown in FIG. 20. That is, in the two-leg type of fishing line guide, curved portions 82, 83 are formed between a pair of fixing parts 75, 76 and the connecting parts 57, 58, the amount of reinforced fiber of the curved portions 82, 83 may be larger than that of the connecting parts 57, 58, or the ratio (weight %) of synthetic resin may be higher than that of the connecting parts 57, 58, or the connecting part 57, 58 may be formed thicker, the sectional area may be larger. Or such curved portions 82, 83 may separately be formed therein with reinforcement layers.

Figure 14:
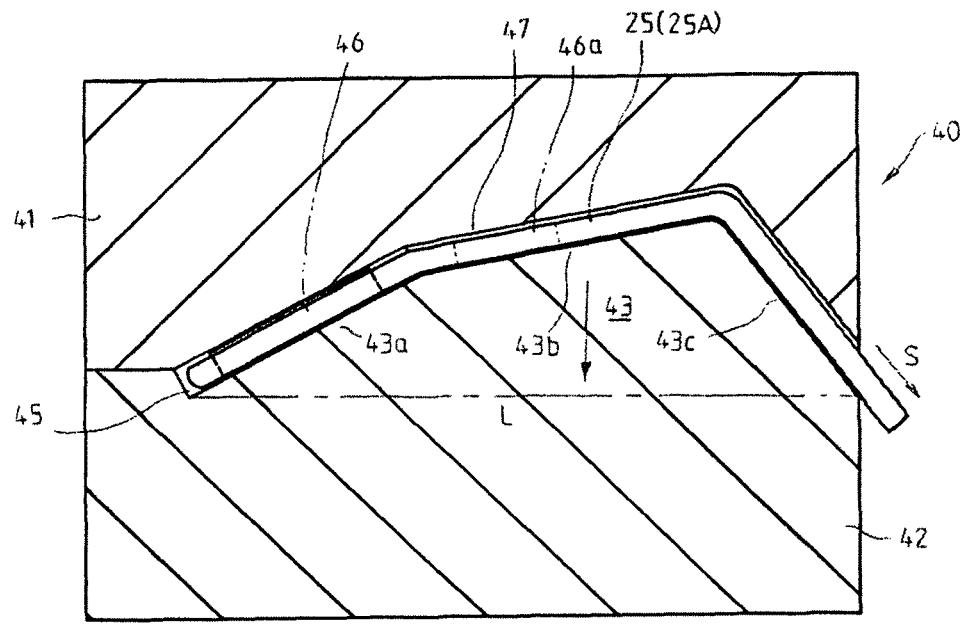
FIG. 14 is a sectional side view showing a mold structure for molding the frame forming the fishing line guide shown in FIG. 10.
Figure 15:
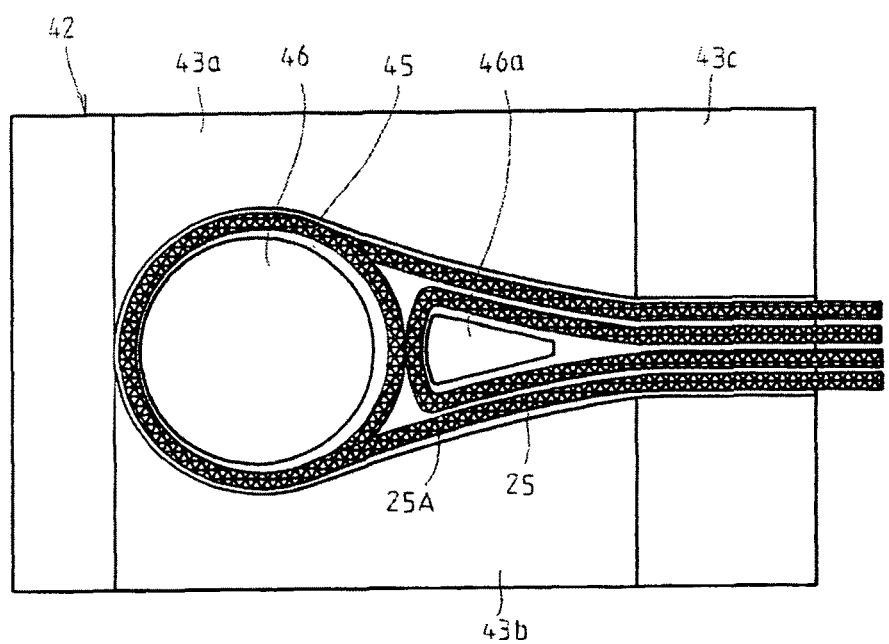
FIG. 15 is a plan view showing a state that a fiber reinforced synthetic resin material is arranged in a groove formed on a convex side surface of the mold shown in FIG. 14.
Figure 16:
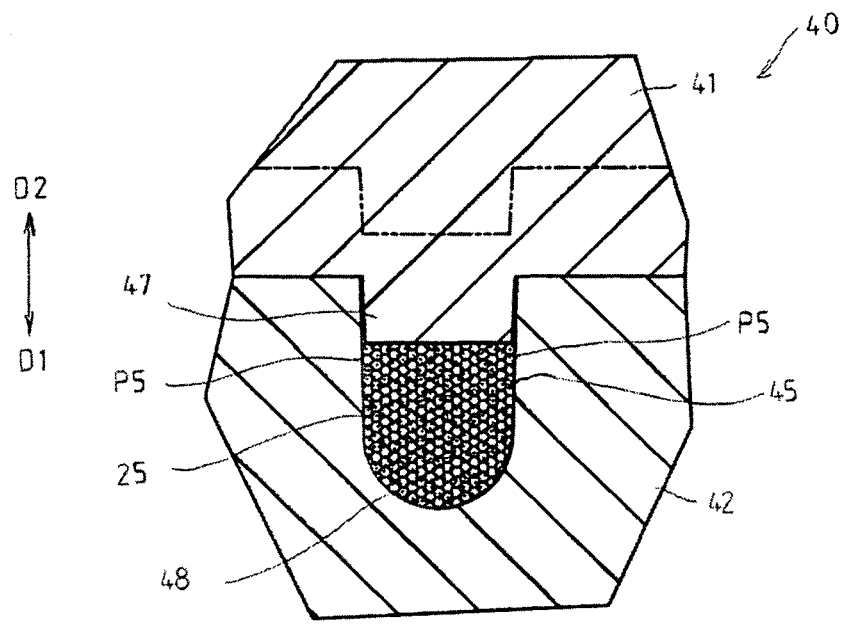
FIG. 16 is a sectional view showing a state that a concave side mold is pressed relative to a fiber reinforced synthetic resin arranged in a groove formed on a block side surface.

Next, method of forming the frame 3 type as described above will be described with reference to FIG. 14 to FIG. 16. FIG. 14 is a sectional side view showing a mold structure for molding the frame forming the fishing line guide shown in FIG. 1. FIG. 15 is a plan view showing a state that a fiber reinforced synthetic resin material (fiber bundle) is arranged in a groove formed on a convex side surface of the mold shown in FIG. 14. FIG. 16 is a sectional view showing a state that a concave side mold is pressed relative to a fiber reinforced synthetic resin arranged in a groove formed on a block side surface.

The frame 3 as shown in FIG. 10 and FIG. 11 may be formed by the mold 40 shown in FIG. 14. The mold 40 may be made of metal material and may also be made of other material (besides casting, ceramics, and synthetic resin, natural materials such as gravel, stone, etc. may be used). The mold 40 according to this embodiment is formed of upper mold 41 and lower mold which are detachable. FIG. 15 is a schematic view showing the lower mold 42 viewed from an upper side thereof when the upper mold 41 are opened relative to the lower mold 42. In this case, the lower mold 42 is formed thereon with a crest 43 one end surface side of which is a slow inclined surface 43a, 43b, the other end surface side of which is an inclined surface 43c steeper than the slow inclined surface 43a, 43b, and a sectional surface of which is formed approximately in a triangle shape. The crest 43 is formed so as to correspond with curved portions forming the ring holding part 5, the connecting part 7 and the fixing part 6 in the frame 3. That is, the fixing part 6 of the frame 3 is formed at the steeply inclined surface 43c side, the ring holding part 5 and the connecting part 7 (connecting member) in the frame 3 are formed at the slow inclined surface 43a, 43b.

The mold 40 is provided thereon with a concave surface and a convex surface that are in contact with each other, any one surface of which is formed thereon with a groove for forming the frame 3. In this case, it is preferable that a groove 45 for molding the frame is formed at the convex surface side (a surface of the lower mold 42 in which the crest 43 is formed). In detail, the groove 45 is configured to be arranged therein with the fiber bundle 25, 25A formed as described in the foregoing, as shown in FIG. 15. A ring shaped convex part 46 is formed at a part at which the opening 5A of the ring holding part 5 is formed, an approximately triangle shaped convex part 46a is formed at a part in which the through hole 7A of the connecting part 7, and the groove 45 for molding the frame is formed adjacent the convex part. Thereby, the fiber bundles 25, 25A are continuously arranged throughout the ring holding part 5, connecting part 7 and fixing part 6 that form the frame 3 shown in FIG. 10 and FIG. 11. Meanwhile, the fiber bundle may continuously be arranged throughout at least two parts among the ring holding part 5, the connecting part 7 and the fixing part 6. It is preferable that the fiber bundle is easily inserted in the groove 45, one fiber bundle may be inserted in the groove, and dozens of fiber bundles may separately be inserted in the groove.

As described above, the groove 45 for molding the frame is formed at the convex surface side (a surface of the lower mold 42 in which the crest 43 is formed), thereby it is possible to form the frame 3 of high quality having curved portions without lowering the rigidity. In detail, as shown in FIG. 15, first, it is performed a process that the fiber bundle 25, 25A is curved (forming of a loop) along and arranged in the groove 45. While the fiber bundles 25, 25A are buried, when tensile force S is applied to one end of the fiber bundles 25, 25A protruded from the mold, the tensile force tends to act in a direction of straight line L in a state of having no crest, thereby it is possible to deeply insert the fiber bundles 25, 25A in the groove 45.

In this manner, it is possible to easily accurately arrange the fiber bundles 25, 25A along the extending direction of groove in the groove 45 formed in advance. That is, the fiber bundles 25, 25A can be easily arranged in the groove and the fiber bundles 25, 25A do not exist in a winding state within the groove, or are not floated from the groove, thereby it is possible to form the frame 3 having an improved stiffness of high quality, and stabilized.

Meanwhile, the upper mold 41 provided with a concave surface is formed with a convex part 47 so as to correspond to the groove 45 formed in the lower mold 42 being pressed. When the upper mold 41 is pressed toward the lower mold 42, the convex part 47 becomes a part pressing an exposed part of the fiber bundles 25, 25A arranged within the groove 45. In this manner, the fiber bundles 25, 25A are arranged within the groove 45 and then it is performed a process that the upper mole 41 is pressed toward the lower mold 42 so that the frame is heated and molded in a pressed state, thereby it is possible to mold the frame 3 shown in FIG. 10 and FIG. 11. In this case, the fiber bundle may be inserted in the groove in a state (a falsely hardened state) that the fiber bundle has been formed in a groove shape formed in the mold.

Meanwhile, it is preferable that a shape of the groove 45 formed in the lower mold 42 and a shape of the convex part 47 of the upper mold 41, which is inserted in the groove 45, are formed in advance so that the sectional shape of the frame to be formed may be formed in the following shape. That is, the upper mole 41 and the lower mold 42 are configured in such a manner that: in a sectional shape of at least any one among the connecting part 7 and ring holding part 5 after molding the frame, the maximum width part thereof is positioned at a front end side or a rear end side in a forward and backward direction, and the width thereof becomes smaller toward the other side from the maximum width part. In detail, as shown in the sectional shape of FIG. 16 (a sectional shape of the connecting part 7 is shown, the direction of arrow D1 indicates the front end side, and the direction of arrow D2 indicates the rear end side), the position P5 of the rear end side has the maximum width in the sectional shape, and the other side of the front end side is formed in a curved shape so as to become smaller gradually in its width toward the end part. For this reason, the parting line of the groove 45 formed in the lower mold is formed in a curved surface 48 (the cross section is formed approximately in a U shape) a front end side of which is narrow, thereby manufacture the frame structure a sectional shape of which has the maximum width at the rear end side thereof can be easily manufactured.

According to the frame structure having a sectional shape as described above, during a molding of the frame, the fiber bundle is stably arranged within the groove 45 thereby a winding movement and contortion of the reinforced fiber may be prevented, and the feature of reinforced fiber may effectively be applied thereby enabling to achieve enhancement in rigidity and stabilization in the fishing line guide. Since it becomes possible to neatly finish an outer surface of the frame after molding of the frame in addition to the effect of tensile force in the previously described fiber bundle, thereby it is possible to simplify or omit a post process which will be described later.

Figure 17:
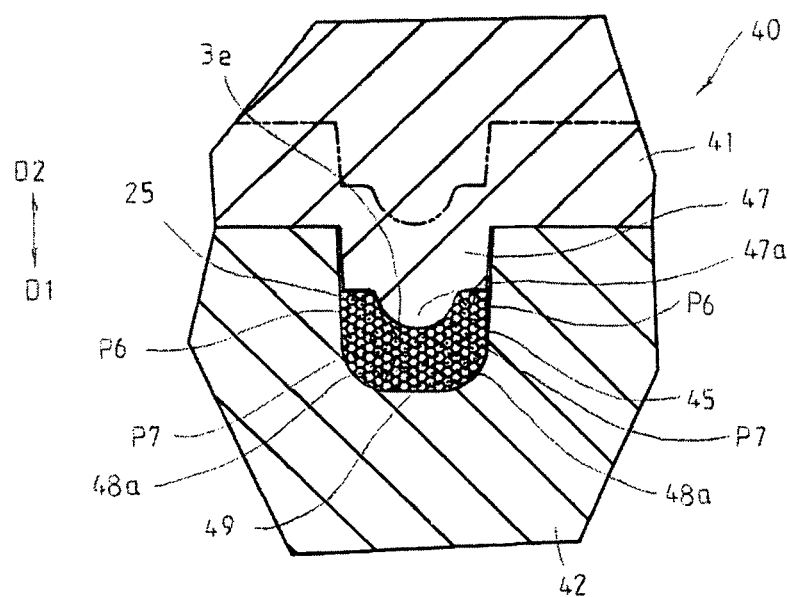
FIG. 17 is a sectional view showing an illustrative modification of a concave side mold in the structure shown in FIG. 16.

FIG. 17 is a view showing an illustrative modification of a sectional shape of the frame. The sectional shape, according to the illustrative modification shown in FIG. 16, has a maximum width at a position P6 of a rear end side and a curved surface a width of which becomes smaller at a front end side of the other side (the front end is formed not in a curved surface but in a flat surface, and the curved surface is formed to be changed to a flat surface). For this reason, the parting line of the groove 45 formed in the lower mold is formed of a flat front end surface 49, and a curved surface 48a a width of which becomes gradually smaller from the position P7 of a front end side to be changed to a flat shape. Thereby the frame structure having a rear end side of a maximum width in the sectional shape can be easily produced. According to the illustrative modification, a protrusion 47a protrudes in a curved shape at the center of the convex part 47 in the upper mold 41, when the fiber bundle 25, 25A is pressed, the convex part 3e curved at the rear end face can be formed. Thereby, it is possible to keep the frame 3 light-weighted without lowering of specific strength and specific stiffness. Meanwhile, the sectional shape of the frame is not limited to the above-described embodiment, but the sectional shape may be formed arbitrarily by a groove shape in the mold, or a division method of a mold (method of division or the number of division, direction of division, etc.).

As described above, the fiber bundle 25, 25A is arranged along a direction extended in the groove 45, and then, matrix material is hardened by applying a heating process thereby the frame is molded. Like this, the frame molded in the mold may easily be removed from the mold by preparing a push pin for pulling the frame from the mold or inserting the push pin in the mold, and then, detailed processing is performed as occasion demands. The detailed processing includes, for example, forming the fixing part 6 of the fishing rod in a curved shape so that the fixing part may easily be attached to the fishing rod, or polishing an end side of the fixing part so that the fixing part may easily be wound or fixed thereto.

The surface treatment may be performed on the frame 3 after a molding of the frame. For example, by performing barrel finishing, burr of surface may be eliminated, and at the same time, sand polishing is performed so that surface gloss may be obtained. The degree of polishing may be controlled by arbitrarily controlling an abrasive or a polishing time according to size, or shape, material characteristic, etc. in the fishing line guide. By performing such barrel processing, it is possible to polish the frame 3 without cutting reinforced fiber, thereby enabling to achieve stabilization in rigidity and making it possible to produce a fishing line guide excellent in an appearance thereof.

Meanwhile, when such a polishing process is performed, it is preferable that polishing is performed so that reinforced fiber may partly be exposed on a surface of the frame 3 and a matrix resin partly remains on a surface of the frame 3. In this manner, it is possible to further enhance a gloss on the surface polished thus.

Next, as occasion demands, the whole or part of the frame 3 may be coated. For example, to enhance an appearance of the frame or to protect a main body of the frame, painting may be performed, or, metal or ceramics deposition may be performed.

The guide ring 20 is attached to the opening 5A of the ring holding part 5 of the frame 3 formed as described above. The method of attaching the guide ring 20 may include a press-in method, an adhesion method, a curling method, and the other fixing method.

The fishing line guide 1 formed in such a manner is light-weighted, and excellent in quality, specific strength, specific stiffness, and flexibility compared with metal products. For this reason, even though a plurality of fishing line guides are mounted on a fishing rod, the fishing rod does not become heavy thereby enhancing performance of the fishing rod. Particularly, since a lightweight in a base rod can be achieved, an angular can sense even a delicate strike (fish bite) thereby it is possible to enhance performance of the fishing rod. Since a reinforced fiber extending in a direction extended as described above is arranged in the region of the ring holding part 5 or in the region of the connecting part 7, flexibility is enhanced thereby preventing the fishing line guide from being damaged even though a heavy load is occurred on the fishing line guide when a fishing line is caught in any other obstacles. Even though a big bending stress acts on the fishing line guide because a bending angle is large in the region of being changed from the fixing part 6 to the connecting part 7, the fishing line guide may be prevented from being damaged because it has been reinforced effectively by a reinforced fiber having such orientation characteristic.

Since the frame is integrally formed of the fiber bundles 25, 25A using the mold 40 as described above, it is easy to arbitrarily change width, thickness, sectional shape, etc. in the frame thereby enhancing the degree of freedom in the design. Further, since the fiber bundle is excellent in specific strength, specific stiffness, etc. the fishing line guide may be made to have a high performance using the feature of the reinforced fiber efficiently.

Further, in the structure as described above, when the fiber bundle is arranged in the groove 45, the prepreg sheet of reinforced fiber may partly be arranged to enhance a reinforcement effect or stiffness or any material may arbitrarily be used in combination with the fiber bundle. Particularly, additional material (for example, prepreg sheet cut in a predetermined shape, resin sheet, metal film, etc.) may be arranged at a part in which any one among width, thickness and sectional area is changed, thereby it is possible to reinforce a corresponding part or to enhance stiffness.

Meanwhile, in the structure as described above, the reinforced fiber extending in an extending direction of the frame 3 may not be formed in a bundle state, and the reinforced fiber continuously extended along the frame may be arranged at an interval from each other. Although it is preferable that the reinforced fiber is prepared without being disconnected throughout the frame as a whole (particularly, it is preferable that the ring holding part 5 is arranged without being disconnected throughout the entire circumference), a continuous fiber may be arranged along an extending direction according to each holding part, fixing part, connecting part, etc. in the parts for forming the frame.

In the method of manufacturing the previously described fishing line guide, although it is exemplified that the fiber bundle (fiber reinforced material impregnated with synthetic resin in reinforced fiber) is arranged in the groove 45 of the mold to mold the frame, the following method may also be adopted.

That is, a reinforced fiber which includes materials as described in the foregoing is inserted in the groove 45 of the mold, and then, the groove 45 is filled with a synthetic resin described previously, or the groove 45 may be filled simultaneously with a reinforced fiber and a synthetic fiber together. After the groove 45 of the mold is filled with a synthetic resin, the groove 45 may be filled with the reinforced fiber so that the reinforced fiber may be in contact with the synthetic resin. Alternatively, the previously described fiber bundle may be arranged in the groove, and the reinforced fiber may separately be inserted in the groove 45 in combination with the methods as described in the foregoing, or the groove 45 may be filled with the synthetic resin.

Figure 18:
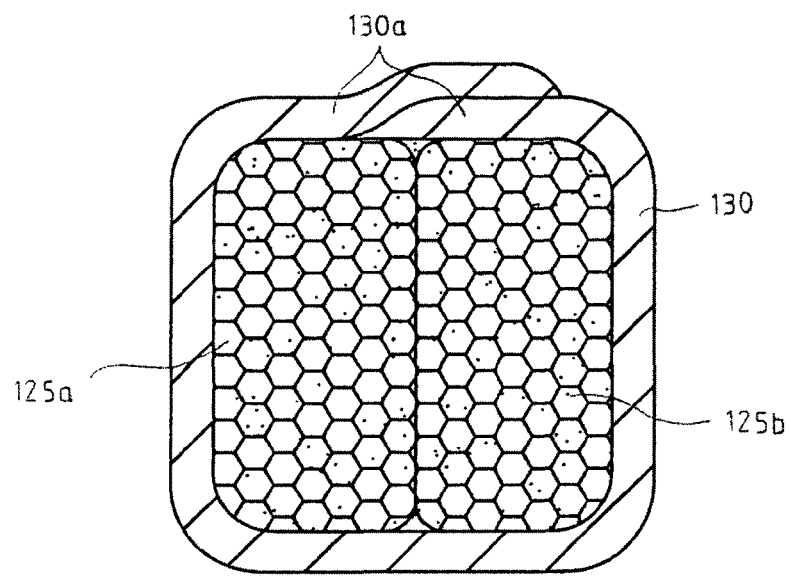
FIG. 18 is a sectional view showing an illustrative modification of a frame structure.
Figure 19:
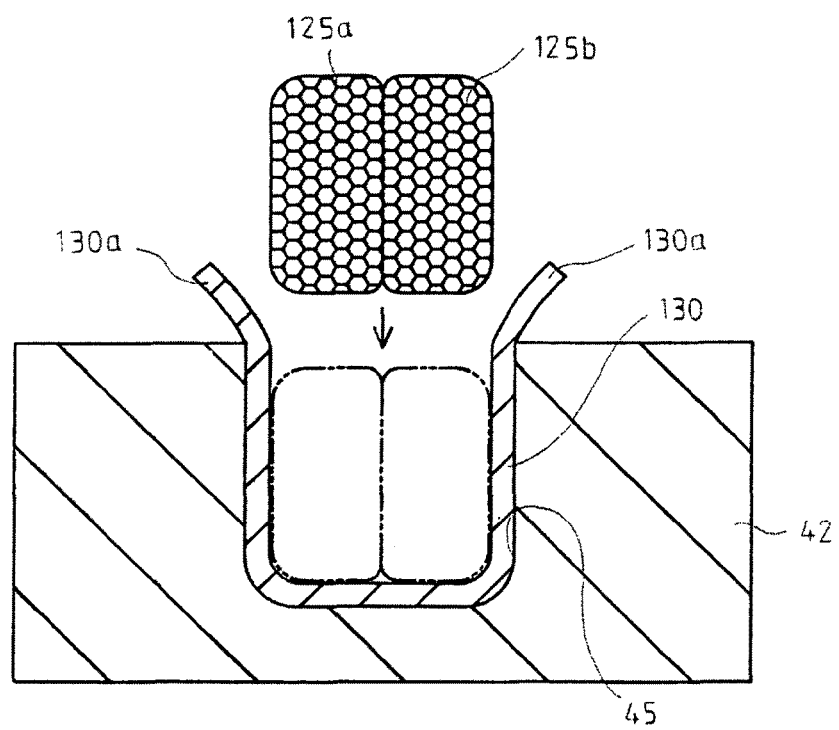
FIG. 19 is a view showing a method of molding the frame shown in FIG. 18.

FIG. 18 is a sectional view showing an illustrative modification of the frame structure. FIG. 19 is a view (lower mold only) showing a method of molding the frame shown in FIG. 18.

The fiber reinforced material forming the frame may be made by combining a plurality of fiber bundles 125a, 125b which includes a bundle of fibers (fiber bundle) formed of a plurality of reinforced fibers shown in FIG. 12, and covering an outer side thereof with an outer layer 130. In this case, the outer layer 130 may be formed by winding glass scrim, woven fabrics and resin film, or by braiding a plurality of reinforced fibers. After finishing the molding by a mold, as shown in FIG. 18, the plurality of fiber bundle 125a, 125b and the outer layer 130 are integrated into one body.

According to the frame structure described above, the outer layer 130 wrapped the circumference of the integrated fiber bundle 125a, 125b, and then, may be inserted in the groove 45 formed in the lower mold 42. Alternatively, as shown in FIG. 19, first, the outer layer 130 is arranged in the groove 45 formed in the lower mold 42, and then, the integrated fiber bundle 125a, 125b may be inserted in the groove 45. In the latter case, in detail, the groove 45 of the lower mold is coated with a mold release, and then coated on the resultant surface with a resin, and semi-dried, and thereafter, the outer layer 130 is arranged on the resultant surface. Next, the fiber bundles 125a, 125b are combined together, and then are arranged in the groove 45. The fiber bundle 125a, 125b is wound on the circumference thereof with the protrusion 130a of the outer layer 130 (the protrusion 130a of the outer layer 130 may not be prepared). Thereafter, as shown in FIG. 14 to FIG. 17, the upper mold 41 is pressed toward the lower mold 42 thereby it becomes possible to mold the frame using a hot press molding.

In this manner, by winding the outer layer on the circumference of the fiber bundle, it may prevent the reinforced fiber or the fiber bundle form peeling between the layers thereby it becomes possible to enhance the stiffness. By preparing the outer layer 130, it is possible to enhance an appearance of the frame as a painted outer layer or a reinforced fiber weaving layer.

Meanwhile, in the structure described above, although the two fiber bundles 125a, 125b are wound around with the outer layer 130, the fiber bundle may be formed of one, or, three or more. In a case where the fiber bundle is formed of two or more, the fiber bundles may be stitched at a boundary part therebetween thereby the fiber bundles are prevented from peeling therebetween. Besides winding the outer layer 130 on the whole outer circumference, the outer circumference may partly be wound around with the outer layer. In this case, if it corresponds to a plurality of fiber bundles, it is preferable to cover at least a part of the boundary part for the rigidity. By covering continuously more than 180 degree among the whole circumference (360 degree in FIG. 18), it may enhance an appearance thereof when viewed from a specific direction. Further, it is preferable that the outer layer 130 is arranged therein with a reinforced fiber in a circumferential direction to surround the fiber bundle. Particularly, a curved part, or branch part is arranged therein with reinforced fibers in a circumferential direction thereby enabling to achieve an enhancement in rigidity. Further, a part, which does not need to achieve an enhancement in an appearance thereof, may have no an outer layer surrounded thereon.

Fourth Embodiment

FIG. 20 is a side view showing an orientation direction of a reinforced fiber in a fiber reinforced synthetic resin material as a view showing a fishing line guide according to a fourth embodiment. FIG. 21 is a view showing a fishing line guide according to a fifth embodiment.

The present invention is not limited to a fishing line guide having one leg described in the previous embodiment, but may be applied to various types of fishing line guides.

FIG. 20 shows a two-leg type fishing line guide 1A. The frame 3A includes a ring holding part 5 holding a guide ring 20, connecting parts 57, 58 extended toward each rear end side and base rod side, and fixing parts 75, 76 curved at the end of each of the connecting parts 57, 58. These parts may also be formed with the fiber bundle 25, 25B, 25C in which a plurality of reinforced fibers is formed in a bundle state in an axial direction. Such the frame 3A may be molded in such a manner that an upper mold is formed as a left and right division type which is divided at a position of the frame 3 and such a left and right division type is pressed toward a lower mold. Meanwhile, as shown in FIG. 20, in the structure in which a guide ring is fixed to a ring holding part, it is preferable that the thickness a of the ring holding part 5 is set larger than the width b thereof to make the fixing (adhesion) area wide. The branch part may be larger in an amount of reinforced fiber or a ratio of reinforced fiber than the connecting part. In this case, the bending stiffness (specific stiffness) in the branch part may be enhanced thereby a rigidity of the branch part may be reinforced intensively.

The present invention may be applied to various types of fishing line guides. Besides the structure shown in FIG. 20, the present invention may be applied to a fishing line guide (movable guide 1B having a fixing tub 96 as shown in FIG. 21) having a fixing part fitted to a fishing rod of telescopic manner, or a to guide mounted on a base rod. The frame structure (for example, a shape or structure of the connecting part) is not limited to the structure of the above described embodiment.

Next, a ring holding part of frame of a fishing line guide which is formed in such a manner described previously will be described with reference to FIG. 22 to FIG. 24 according to a preferred embodiment of the present invention.

As described previously, the frame may be formed using the fiber bundle, for example, as shown in FIG. 12. A ring holding part 5 is formed in a state that such fiber bundle is arranged in a ring shape.

In the structure of the ring holding part 5, it is preferable that a state of reinforced fiber of an inner circumferential side (guide ring side) A1 and an outer circumferential side A2 is set as follows.

Figure 23:
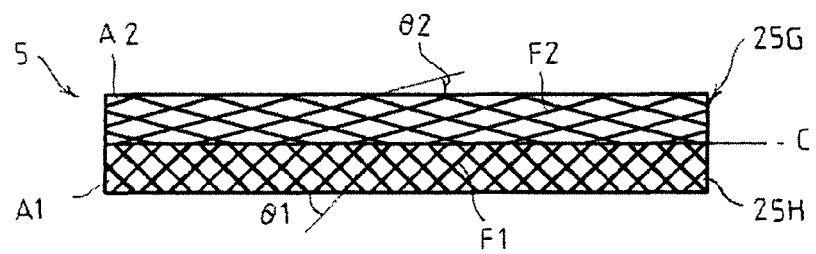
FIG. 23 is an enlarged view showing a fiber state of a fiber reinforced synthetic resin material forming a ring holding part.

That is, first, as shown in FIG. 23, the reinforced fiber of the outer circumferential side A2 is small in a cross angle thereof, and the reinforced fiber of the inner circumferential side A2 is formed relatively large in a cross angle.

FIG. 23 is an enlarged view showing a fiber state of a fiber reinforced synthetic resin material forming a ring holding part. As shown in the drawing, the reinforced fiber. F1 in the inner circumferential side A1 is arranged so that the cross angle $\theta 1$ relative to a circumferential direction C becomes larger than the cross angle $\theta 2$ relative to a circumferential direction C of the reinforced fiber F2 in the outer circumferential side A2.

By setting as shown in FIG. 23 the state of reinforced fiber positioned in the ring holding part 5, the inner circumferential side of the ring holding part becomes a relatively narrow state in the interval between the reinforced fibers, and the reinforced fiber highly tends to be in contact with the outer circumference of the guide ring 20 fitted, thereby it becomes possible to stably hold the guide ring 20. As described above, since the inner side reinforced fiber has a relatively large cross angle, even though the guide ring part is deformed due to a thermal deformation caused by change in temperature (effect of heat during molding, effect of heat generated when fishing line is inserted therein and passes through the guide ring at the time of use, etc.), change in a circumferential direction becomes large compared with a circumferential side thereby making the reinforced fiber easy to follow a thermal deformation of the guide ring, thereby a stabilization in a fixing state of the guide ring is achieved. That is, even though temperature varies, internal stress is seldom occurred in the guide ring 20 inside the ring holding part 5, and it becomes possible to buffer the impact from the outside thereby it is possible to stably hold the guide ring.

Figure 24:
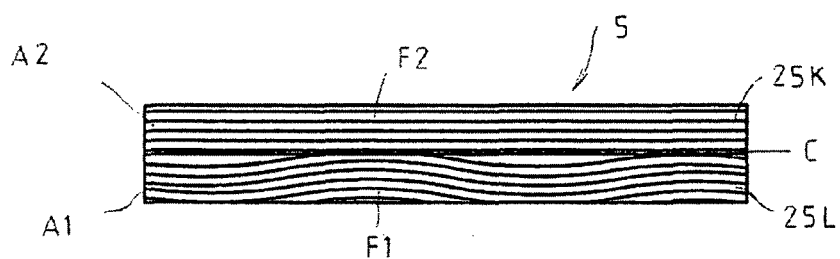
FIG. 24 is an enlarged view showing a fiber state of a fiber reinforced synthetic resin material forming a ring holding part according to another example.

As a second example, as shown in FIG. 24, the reinforced fiber of the outer circumferential side A2 is in a straight line shape and small in the winding amount, and the reinforced fiber of the inner circumferential side is formed so that the winding amount thereof becomes larger relatively than the outer circumferential side.

FIG. 24 is an enlarged view showing a fiber state of a fiber reinforced synthetic resin material forming a ring holding part. As shown in the drawing, the reinforced fiber F1 in the inner circumferential side A1, if comparing relatively with the outer circumferential side A2, is arranged so that the winding amount becomes larger than the reinforced fiber F2 of the outer circumferential side A2.

Even in such an arrangement, the inner circumferential side of the winding state, if comparing with the outer circumferential side, highly tends to be in contact with the outer circumference of the guide ring 20 in which the reinforced fiber part is fitted, thereby it becomes possible to stably hold the guide ring 20. Also, since the inner circumferential side reinforced fiber becomes a winding state and accordingly is easily displaced along the circumference direction, even though the guide ring part is changed due to a thermal deformation caused by change in temperature (effect of heat during molding, effect of heat generated when fishing line is inserted therein and passes through the guide ring at the time of use, etc.), change in a circumferential direction becomes large compared with a circumferential side thereby making the reinforced fiber easy to follow a thermal deformation of the guide ring, thereby a stabilization in a fixing state of the guide ring is achieved. That is, even though temperature varies, internal stress is seldom occurred in the guide ring 20 inside the ring holding part 5, and it becomes possible to buffer the impact from the outside thereby it is possible to stably hold the guide ring.

Figure 25:
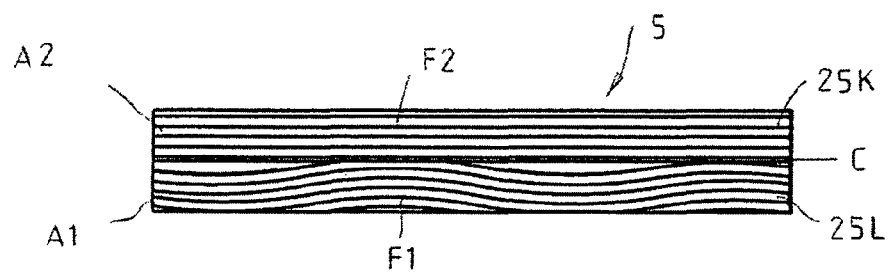
FIG. 25 is a view showing an illustrative modification in a base end side of a connecting part of a frame.

Meanwhile, in FIG. 24 and FIG. 25, although the inner circumferential side A1 and the outer circumferential side A2 are adjacent from each other, a plurality of interlayer layers (arbitrarily determine the number of layers, thickness and direction of reinforced fiber, and the number of fiber bundles) may additionally be arranged therebetween.

In this manner, by increasing the ratio of reinforced fiber of the outer circumferential side, the outside of the ring holding part 5 becomes larger in its rigidity than the inner side thereof, thereby it becomes possible to enhance its strength. Since the inner circumferential side of the ring holding part is relatively low in the ratio of reinforced fiber, the ring holding part may easily be deformed, the internal stress is seldom occurred in the guide ring 20 inside the ring holding part 5 even though temperature varies, and it is possible to buffer the impact from the outside, thereby it becomes possible to stably hold the guide ring.

FIG. 25 is a view showing an illustrative modification in a base end side of a connecting part of the frame.

Figure 22:
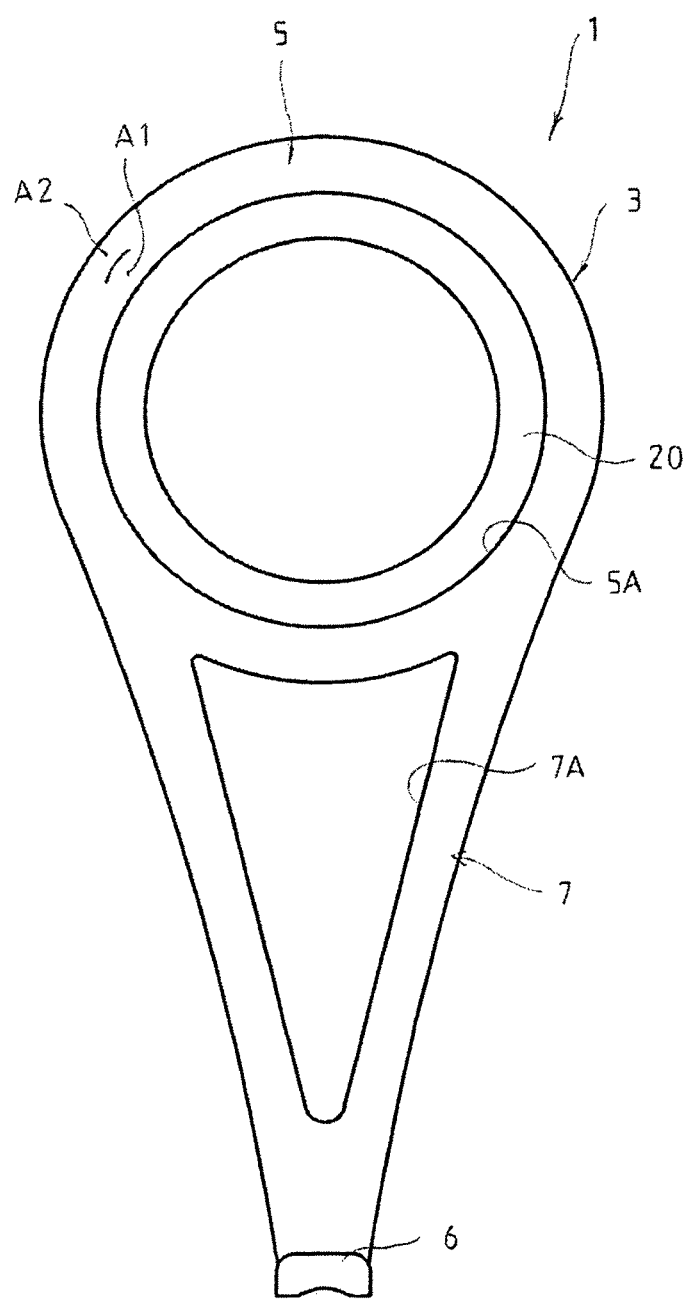
FIG. 22 is a front view of a frame, as a view illustrating a preferable aspect of a frame forming a fishing line guide.

As described previously, it is possible to mold the frame of the fishing line guide shown in FIG. 22 by the manufacturing method described with reference to FIG. 14 and FIG. 15. In this case, in the curved region in which the fixing part 6 is changed to the connecting part 7, when the fiber bundle is arranged along a length direction, the fiber bundle branches off in two legs through the curved region (see FIG. 10 and FIG. 11), but there may be a decline in strength in the branch region.

For this reason, as shown in FIG. 25, it is preferable that a reinforcing member 100 is arranged at a region of being divided into two legs (opening region 200 of base end side divided into two legs). In this case, it is preferable that the reinforcing member 100 is made of the same fiber reinforced synthetic resin material as the fiber bundle for molding of the frame. That is, by using the same material as the frame, it becomes possible to prevent the reinforcing member from peeling. The reinforcing member 100 is formed higher in its height h2 than height h1 of the fixing part 6 thereby it becomes possible to effectively enhance a torsional strength of the frame.

Meanwhile, such a reinforcing member 100, when the fiber bundle is arranged in the groove 45 as shown in FIG. 15, may be arranged at a gap of a branch part divided in two legs, or at a region in which the fiber bundle itself is curved. By arranging the reinforcing member at such a position, the connecting part, which is branched after being molded, is reinforced because an opening region of the base end part is integrally combined. The reinforcing member 100 may be made of a synthetic resin or a metal material.

Figure 26A:
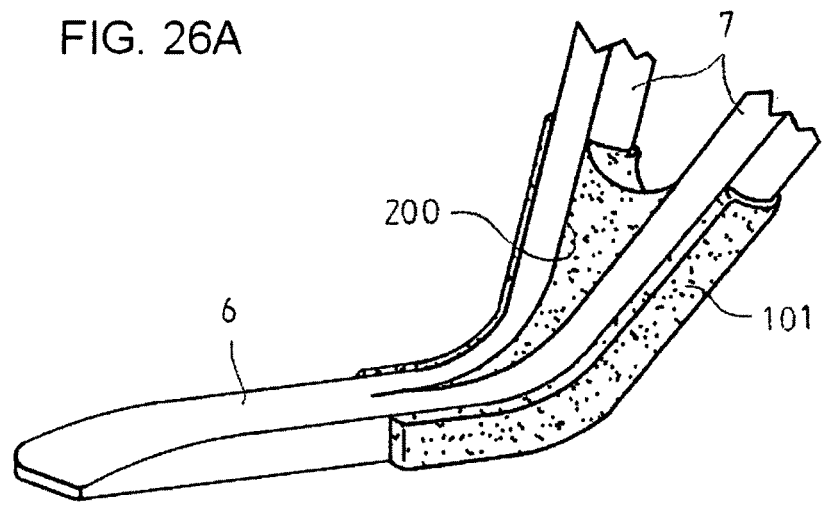
FIG. 26A is a view showing another illustrative modification in a base end side of a connecting part of a frame.
Figure 26B:
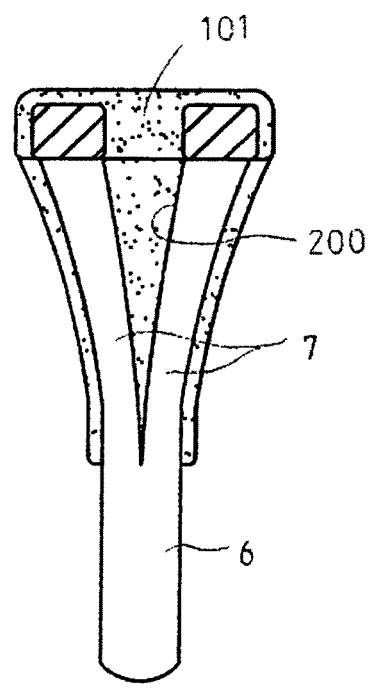
FIG. 26B is a sectional view of the base end side of the connecting part.

FIG. 26A is a view showing another illustrative modification in a base end side of a connecting part of the frame, and FIG. 26B is a sectional view of the base end side of the connecting part.

The reinforcing member 101 according to the illustrative modification is arranged not only in the opening region 200 of the branch part divided into two legs of the connecting part, but also in the adjacent region thereof. In this manner, since the reinforcing member is prepared even in the surroundings in addition to the opening region of the branch part divided into two legs of the connecting part, it is possible to further enhance the effect of reinforcement (enhancement in torsional strength). Meanwhile, such a reinforcing member 101 may be flush with the frame surface so that the reinforcing member does not protrude from a surface of a butt rod side (from which a fishing line is caught and escapes) of the frame, or may be surface-treated so that irregularity is not generated, as shown in the drawing.

Figure 27:
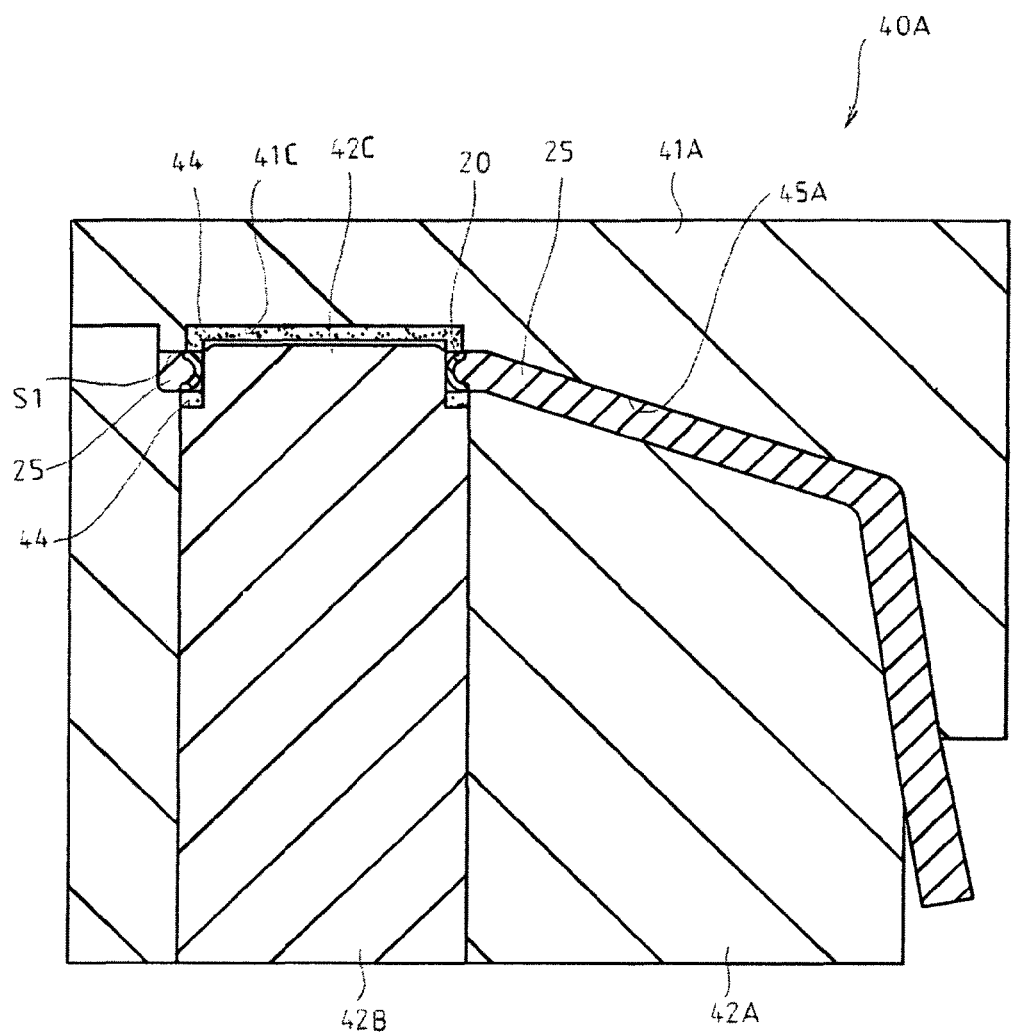
FIG. 27 is a view showing a mold structure for molding a frame forming a fishing line guide according to another embodiment.

FIG. 27 is a view showing another embodiment of a mold structure for molding the frame forming a fishing line guide.

The embodiment illustrates a method of molding the frame, and at the same time, mounting a guide ring, as shown in the drawing. As shown in the drawing, the mold 40A includes a upper mold 41A and a lower mold 42A basically, as shown in FIG. 14, and the lower mold 42A is arranged therein with a die 42B (die moves downward) to form a ring holding part of fixing a guide ring. The die 42B is formed thereon with a circumference shaped convex part 42C, and a space S1, in which a fiber reinforced synthetic resin material is arranged to form a guide ring 20 and a ring holding part, is formed between the circumference shaped convex part 42C, the lower mold 42A, and the groove 45A which will be described later.

The upper mold 41A is formed therein with a ring shaped concave part 41C to meet at a position of forming a ring holding part (in detail, corresponding to a position the guide ring 20 is arranged). Also, the groove 45A for molding the frame) is formed, as shown in FIG. 14, between the upper mold 41A and the lower mold 42A.

When the frame is molded by the mold structure described above, first, the die 42B is set on the lower mold 42A, a burr prevention member (an excellent sealing material, for example, a soft material such as rubber) is arranged in an outer circumferential step section of the circumference shaped convex part 42C, in addition, the guide ring 20 is fitted and fixed to the surroundings of the circumference shaped convex part 42C. And, the fiber bundle 25 is arranged along an extending direction in the groove 45A, and at the same time, is arranged to surround an outer circumferential side of the fixed guide ring 20 in the space S1. Thereafter, the burr prevention member (soft member) 44 is arranged even in the concave part 41C and the upper mold 41A is pressed toward the lower mold 42A and heated. At this time, since the guide ring 20 is in a state that the upper and lower portions thereof are pressed by the burr prevention member (a state that guide ring is sandwiched and sealed by the burr prevention member), there is no possibility that resin flows in the guide ring 20 from the ring holding part region.

After completing a heating process, if the die 42B is separated from the mold and the upper mold 41A and the lower mold 42A are separated from each other, the frame mounted therein with the guide ring 20 is molded. In this case, during a heating process, since the burr prevention member 44 serves to prevent resin from flowing in an inner side of the guide ring 20, it prevents burr from being generated at a boundary region between the guide ring 20 and the ring holding part.

Of course, the manufacturing method of simultaneously mounting a guide ring, as described in the foregoing, is just described as an example, but may properly be modified in an arrangement of the burr prevention member, a direction of pulling a molding box, etc.

As described in the foregoing, in a case where a guide ring is mounted on a ring holding part, there is a method of fixing a guide ring formed of SIC or titanium, etc. to a ring holding part and a method of forming a ring holding part itself as a guide ring or a part of guide ring. In the case of the method of fixing a guide ring to a ring holding part like the former, as shown in FIG. 27, there are various methods such as a method of arranging in a mold and simultaneously fixing a fiber reinforced synthetic resin material and a guide ring while molding, a method of fixing a guide ring to a ring holding part by means of adhesion or deposition, etc. after forming the frame by various methods, or a method of fixing a guide ring by means of adhesive and the like in a final process after a polishing process or a surface treatment of the frame, etc. It is possible to mount a guide ring on a ring holding part at any one step of manufacturing processes.

In the case of forming a ring holding part as a guide ring or a part of guide ring, there are various methods such as a method of arranging a fiber reinforced synthetic resin material in a mold, and at the same time, forming a flat fishing-line-guide surface for guiding a fishing line to a ring holding part at a molding step, a method of forming a fishing line guide member by polishing a ring holding part after molding the frame, or a method of coating ceramic material having a durability of abrasion, metal material, synthetic resin material, etc. on the fishing line guide member of a ring holding part and polishing the surface for gloss if necessary.

In the foregoing, although preferred embodiments of the present invention have been described, the present invention is not limited to the above-described structure, but may be modified in various shapes.

In the present invention, any one of frame parts of forming the fishing line guide may include a part in which reinforced fiber is formed of fiber bundle. That is, Such a reinforced fiber may not necessarily be formed in a bundle state as long as the reinforced fiber of fiber reinforced synthetic resin for forming the frame extends in an extending direction of the frame. The present invention is not limited to the structure and arrangement such as sort, modulus of elasticity, amount of impregnated resin, diameter, etc. of reinforced fiber extending in an extending direction of the frame, as described in the foregoing according to preferred embodiments, but it may be modified in various shapes.

It is possible to properly modify the method of arranging the fiber bundle when molding the frame using a mold. For example, besides arranging of the fiber bundle shown in FIG. 11, the fiber bundle may be arranged in a ring shape in the surroundings of the ring holding part 5, and the ring holding part may be wound approximately by half through the connecting part from the fixing part of one end side, thereafter, the fiber bundle may be arranged from the connecting part of the other end side to the fixing part (as shown in FIG. 11, it may not wind the fiber bundle by 1 cycle at a part of the ring holding part). Also, the fiber bundle may be arranged in a ring shape or approximately in a C shape in a groove formed in the mold, that is, it may properly modified. Further, the mold 40 for molding the frame, as described previously, is just described as an example, but, regarding the direction of dividing the mold, the mold may be formed in an arbitrary shape of being divided a left and right direction, or an inclined direction, etc.

What is claimed is:

1. A fishing line guide to be attached to a fishing rod, said fishing line guide comprising a frame, said frame comprising:
   a fixing part to be fixed to an exterior surface of the fishing rod, said fixing part extending in a first plane;
   a holding part which holds a ring-shaped guide ring through which a fishing line is to pass; and
   a connecting part connecting the fixing part to the holding part, said connecting part extending obliquely from the first plane in a second plane at a first end of the connecting part and said holding part extending from a second end of the connecting part,
   wherein the frame comprises a fiber reinforced synthetic resin including a fiber bundle including a plurality of reinforced fibers extending in an extending direction of a part forming the holding part and the connecting part,
   wherein said fixing part, said holding part, and said connecting part comprise the plurality of reinforced fibers extending therethrough,
   wherein the plurality of reinforced fibers are continuously formed from the holding part to the connecting part, and
   wherein ends of the plurality of reinforced fibers are embedded in said fixing part.

2. The fishing line guide according to claim 1, wherein the plurality of reinforced fibers are tangled with each other.

3. The fishing line guide according to claim 1, wherein the plurality of reinforced fibers extend to at least a quarter cycle of the holding part.

4. The fishing line guide according to claim 1, wherein the plurality of reinforced fibers of the fiber bundle are braided.

* * * * *